(12) United States Patent
Bangel et al.

(10) Patent No.: US 7,827,050 B2
(45) Date of Patent: Nov. 2, 2010

(54) COMPREHENSIVE GOAL MANAGEMENT THROUGH THE USE OF AN INTEGRATED SOFTWARE APPLICATION

(75) Inventors: Matthew J. Bangel, Poughkeepsie, NY (US); Scott D. Hicks, Underhill Center, VT (US); James A. Martin, Jr., Endicott, NY (US); Renee C. Mullins, Austin, TX (US); Diane C. Rauch, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 1651 days.

(21) Appl. No.: 11/058,546

(22) Filed: Feb. 15, 2005

(65) Prior Publication Data

US 2006/0184409 A1  Aug. 17, 2006

(51) Int. Cl.
*G06F 17/50* (2006.01)
(52) U.S. Cl. .......................................................... 705/7
(58) Field of Classification Search .................. 705/7–9, 705/35
See application file for complete search history.

(56) References Cited

U.S. PATENT DOCUMENTS

| | | | |
|---|---|---|---|
| 5,832,455 A | 11/1998 | Hayashi et al. | |
| 7,110,988 B1 * | 9/2006 | Allemann et al. | 706/7 |
| 2003/0154232 A1 | 8/2003 | Beringer et al. | |
| 2003/0204440 A1 * | 10/2003 | Koller et al. | 705/11 |
| 2004/0107010 A1 | 6/2004 | King | |
| 2004/0133546 A1 | 7/2004 | Oni | |
| 2004/0172320 A1 | 9/2004 | Spellman et al. | |
| 2004/0186762 A1 * | 9/2004 | Beaven et al. | 705/8 |
| 2006/0129439 A1 * | 6/2006 | Arlt et al. | 705/7 |

FOREIGN PATENT DOCUMENTS

WO  WO 01/50387  12/2001

OTHER PUBLICATIONS

IBM Technical Disclosure Bulletin, Integrated Smart Steps Application Model, vol. 41, No. 01, Jan. 1998, pp. 205-206.
Goals 2004: Define your Dreams & Create the Plan to Reach Them; Copyright 2004 Lisa Leguenec and No Dream Too Big, LLC; 119 pages.

* cited by examiner

*Primary Examiner*—Susanna M Diaz
(74) *Attorney, Agent, or Firm*—Schmeiser, Olsen & Watts; Anna L. Linne

(57) ABSTRACT

A method, system and computer program product for managing goals. A goal to be achieved by a goal-setter is defined. At least one action to be completed is defined. The at least one action is associated with an achievement of the goal by the goal-setter. One or more goal-setter attributes associated with the goal-setter are specified. At least one of the one or more goal-setter attributes is associated with the goal to facilitate managing the goal.

27 Claims, 39 Drawing Sheets

FIG. 10D

COMPREHENSIVE GOAL MANAGEMENT THROUGH THE USE OF AN INTEGRATED SOFTWARE APPLICATION

BACKGROUND OF THE INVENTION

1. Technical Field

The present invention relates to a goal management method and system, and more particularly to a comprehensive goal management method and system employing a software application that integrates goal management aspects.

2. Related Art

Self-help programs and books stress the importance of goal setting. These sources provide techniques that direct individual goal-setters to write their goals and action plans on paper. Being on paper, these goals and action plans are difficult to maintain and modify, and easy to cast aside and ignore. Other conventional goal setting techniques employ an electronic device to specify goals, but unfortunately lack comprehensive goal management aspects integrated in a software application. Thus, there is a need for an improved technique for managing goals.

SUMMARY OF THE INVENTION

In first embodiments, the present invention provides a method of managing a goal in a computing environment, the method comprising:

defining a goal to be achieved by a goal-setter;

defining at least one action to be completed, the at least one action being associated with an achievement of the goal by the goal-setter;

specifying one or more goal-setter attributes associated with the goal-setter; and associating at least one goal-setter attribute of the one or more goal-setter attributes with the goal, thereby facilitating said managing the goal.

In second embodiments, the present invention provides a system of managing a goal in a computing environment, the system comprising:

means for defining a goal to be achieved by a goal-setter;

means for defining at least one action to be completed, the at least one action being associated with an achievement of the goal by the goal-setter;

means for specifying one or more goal-setter attributes associated with the goal-setter; and means for associating at least one goal-setter attribute of the one or more goal-setter attributes with the goal, thereby facilitating said managing the goal.

In third embodiments, the present invention provides at least one program storage device readable by a machine, tangibly embodying at least one program of instructions executable by the machine to perform a method of managing a goal in a computing environment, the method comprising:

defining a goal to be achieved by a goal-setter;

defining at least one action to be completed, the at least one action being associated with an achievement of the goal by the goal-setter;

specifying one or more goal-setter attributes associated with the goal-setter; and associating at least one goal-setter attribute of the one or more goal-setter attributes with the goal, thereby facilitating said managing the goal.

In fourth embodiments, the present invention provides a method for deploying computing infrastructure, comprising integrating computer-readable code into a computing system, wherein the code in combination with the computing system is capable of performing a method of managing a goal in a computing environment, the method comprising:

defining a goal to be achieved by a goal-setter;

defining at least one action to be completed, the at least one action being associated with an achievement of the goal by the goal-setter;

specifying one or more goal-setter attributes associated with the goal-setter; and associating at least one goal-setter attribute of the one or more goal-setter attributes with the goal, thereby facilitating said managing the goal.

The present invention provides a comprehensive goal management method and system that facilitates managing (e.g., adding, deleting, and modifying) goals and action plans, and that employs an integrated software application that provides for interaction and relationships between goal management features.

BRIEF DESCRIPTION OF THE DRAWINGS

FIGS. 10D-10E are screen captures of an example of a dream creation form to be employed by the method of creating a dream in FIGS. 10A-10C, in accordance with embodiments of the present invention.

DETAILED DESCRIPTION OF THE INVENTION

Figure 1:
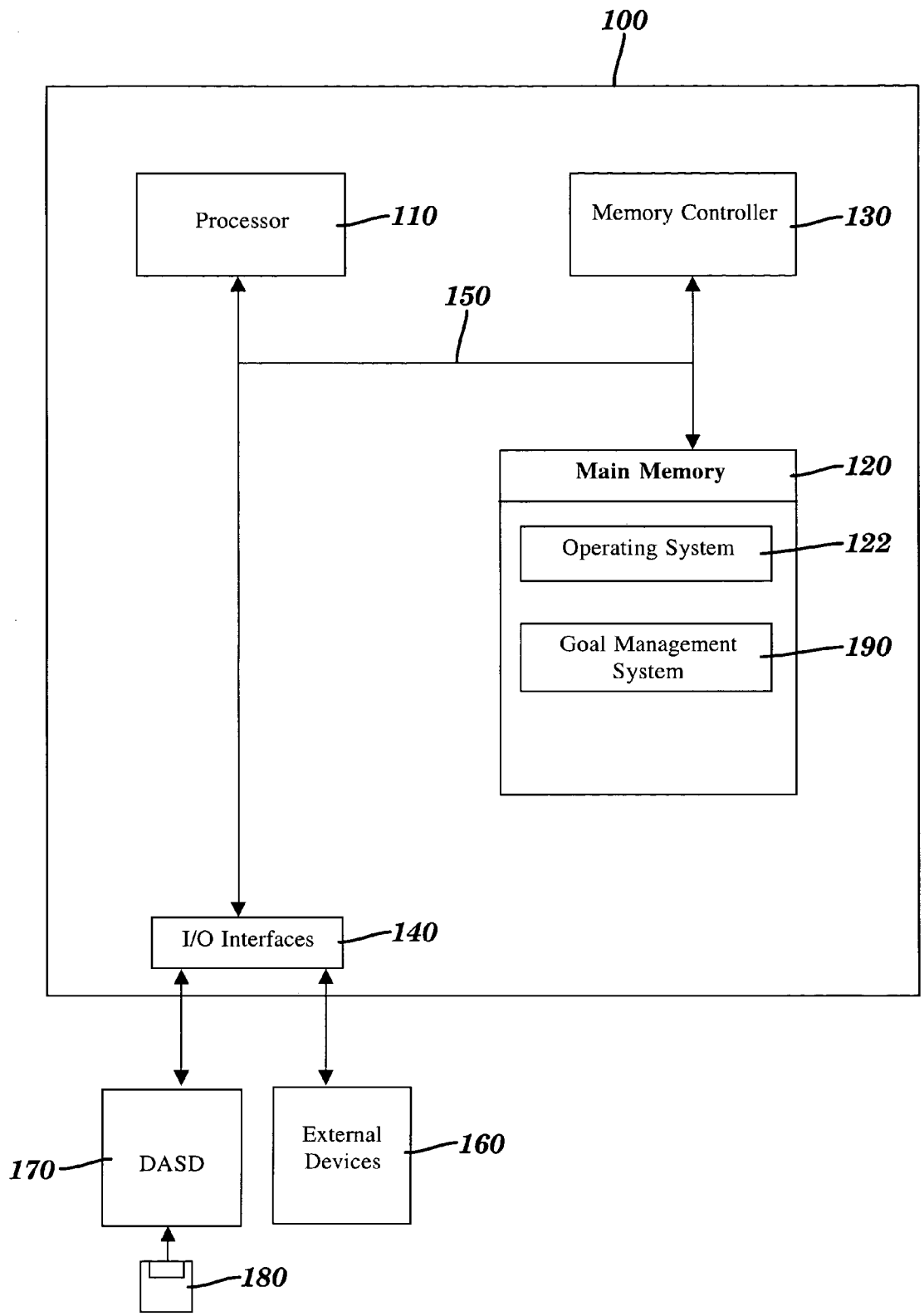
FIG. 1 is a block diagram of a system in accordance with embodiments of the present invention.

FIG. 1 is a block diagram of a system in accordance with embodiments of the present invention. A computer system 100 in accordance with the present invention is a ThinkCentre desktop personal computer offered by International Business Machines of Armonk, N.Y. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, a main memory 120 including an operating system 122, a memory controller 130, and at least one input/output (I/O) interface 140, all of which are interconnected via a system bus 150. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

I/O interfaces 140 may comprise any system for exchanging information from external sources such as external devices 160. External devices 160 may comprise conventional external devices including a personal digital assistant (PDA), cellular phone, pager, web phone, hand-held device, CRT, LED screen, keyboard, mouse, voice recognition system, speech output system, printer, facsimile, etc.

I/O interfaces 140 also allow computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD-ROMs, and transmission type media such as digital and analog communication links, including wireless communication links.

Memory controller 130, through use of a processor (not shown) separate from processor 110, is responsible for moving requested information from main memory 120 and/or through I/O interfaces 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or I/O interfaces 140.

A terminal interface of I/O interfaces 140 allows system administrators and computer programmers to communicate with computer system 100. Although the system 100 depicted in FIG. 1 contains only a single main processor 110 and a single system bus 150, it should be understood that the present invention applies equally to computer systems having multiple processors and multiple system buses. Similarly, although the system bus 150 of the preferred embodiment is a typical hardwired, multidrop bus, any connection means that supports bi-directional communication in a computer-related environment could be used.

Stored in main memory 120 is a goal management system 190 comprising one or more computer programs. Such a computer program stored in memory 120 is used in its broadest sense, and includes any and all forms of a computer program, including source code, intermediate code, machine code, and any other representation of a computer program. Goal management system 190 provides an integrated software application that provides access to a comprehensive set of goal management aspects. Such aspects include, for example, goal management functions that set (e.g., define or add), delete, or modify dreams, sub-goals, independent goals and actions, as well as associations between sub-goals and dreams, and between actions and goals or sub-goals. As used herein, a dream or goal is an achievement toward which effort is directed by an individual or entity. A dream is a high-level goal which includes subordinate goals (sub-goals). An independent goal is a goal that does not include any sub-goals. As used herein, "goal" refers to a high-level goal, a sub-goal or an independent goal. "Goal-setter," as used herein, refers to the individual or entity that directs effort to set, manage and achieve one or more goals. The above-described goal management functions also include, for instance, associating attributes related to the goal-setter to the goals themselves, and to each other. Other exemplary goal management aspects are described below. The integrated software application provided by goal management system 190 is in accordance with the goal management method described below relative to FIGS. 3-13.

It should be understood that main memory 120 will not necessarily contain all parts of all mechanisms shown. For example, portions of goal management system 190 and operating system 122 may be loaded into an instruction cache (not shown) for processor 110 to execute, while other files may well be stored on magnetic or optical disk storage devices (not shown). In addition, although goal management system 190 is shown to reside in the same memory location as operating system 122, it is to be understood that main memory 120 may consist of disparate memory locations.

Architecture

Figure 2:
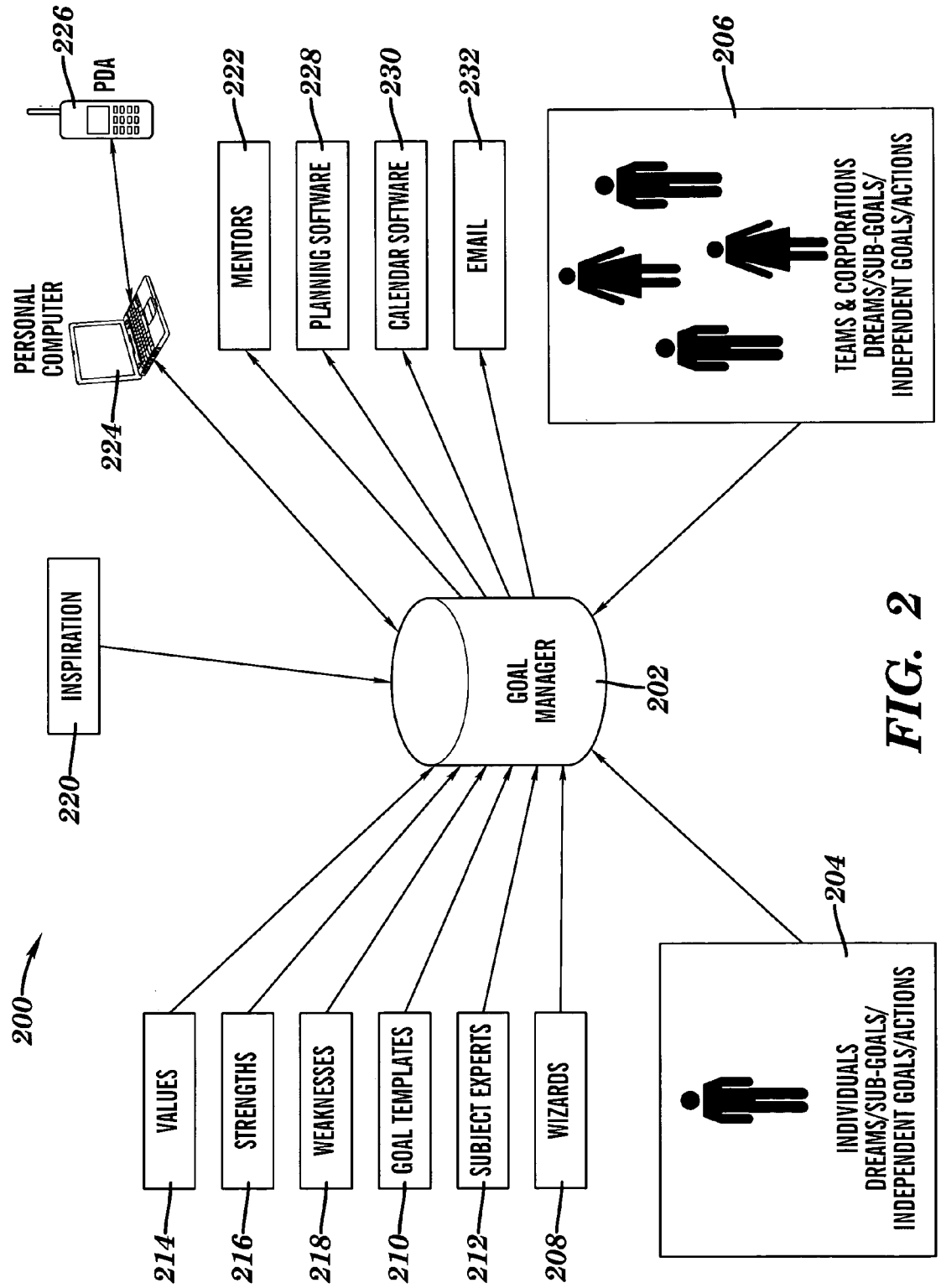
FIG. 2 depicts a goal management architecture implemented in the system in FIG. 1, in accordance with embodiments of the present invention.

FIG. 2 depicts a goal management architecture implemented in the system in FIG. 1, in accordance with embodiments of the present invention. Goal management architecture 200 includes a Goal Manager 202 included in goal management system 190 (see FIG. 1). Goal manager 202 provides goal management aspects for dreams, sub-goals, independent goals, and actions provided by goal-setters. A goal-setter can be an individual person 204 or a team of people, a corporation or other organization 206. Goal-setter 204, 206 defines or specifies attributes directly associated with the goal-setter (i.e., goal-setter attributes), defines attributes associated with goals (i.e., goal attributes), and sets (i.e., defines) a particular goal, defines the goal's associated actions, and associates goal-setter attributes with the goal being defined. As used herein, actions are tasks to be performed and completed by a goal-setter in order to achieve the goal. A series of actions is an action plan. At least some of these goal, goal attribute and goal-setter attribute definitions may be entered via the guidance of a software-implemented wizard 208; a goal template 210 originally defined by goal-setter 204 or other end user of goal management system 190 (see FIG. 1), or a template generated by a subject matter expert 212. A goal template 210 can also employ goal-related information from a previously defined goal.

Goal-setter attributes include, for example, values 214, strengths 216, weaknesses 218, and sources of inspiration 220. The definitions of these goal-setter attributes are received by Goal Manager 202 and used to facilitate managing the goals defined by goal-setter 204. Values 214 are principles or standards espoused by goal-setter 204. These principles or standards held by goal-setter 204 form bases of conduct that is associated, for instance, with the achievement of one or more goals, or the completion of one or more actions, or with some other aspect of the management of dreams, sub-goals, independent goals and actions, and the associations that exist therebetween. In one example, values 214 are ranked by goal-setter 204, and associated with goals to be managed by Goal Manager 202. These value rankings and the values' associations with goals can facilitate management decisions regarding the setting of additional goals, the deletion of previously defined goals, and the modification of previously defined goals, goal attributes and goal-setter attributes.

Strengths 216 are characteristics or traits of goal-setter 204, 206 that facilitate (i.e., increase the likelihood of) an achievement of a goal defined by the goal-setter. Weaknesses 218 are characteristics or traits of goal-setter 204, 206 that hinder (i.e., lessen the likelihood of) an achievement of the goal-setter's goal.

Sources of inspiration include any source that motivates or inspires goal-setter 204, 206. For example, inspiration 220 can motivate goal-setter 204 to achieve the goal defined by goal-setter 204. Such sources of inspiration are broadly defined and can be, for instance, a person, an event, a place, a book, music, art, a quotation, etc.

A goal defined by goal-setter 204, 206 can be associated with a mentor who may provide guidance to the goal-setter relative to the achievement of the goal. Goal manager 202 automatically communicates with mentor 222 to notify the mentor of various goal-related activities or events, such as the achievement of the goal, the nearness of (or passing of) a target date of the goal or target date (i.e., due date) of an action related to the goal, or the modification of such a target date. These mentor notifications may be communicated by any conventional means, such as electronic mail or paging systems. Being automatically communicated, these notifications to mentor 222 do not require any prompting or other action by goal-setter 204, 206 or any other entity external to Goal Manager 202. In other embodiments, these communications with mentor 222 may be initiated by an action of goal-setter 204, 206.

Any goal management function may be directed via a computing unit such as personal computer 224 or PDA 226. Goal manager 202 provides views of goal management information (i.e., information related to dreams, sub-goals, independent goals, actions, goal attributes, goal-setter attributes, and associations therebetween), which can be displayed on personal computer 224 and PDA 226. Other computing devices that are not shown in FIG. 2 can also display goal management information. Goal management information can also be exported to or imported from external software applications. These external software applications include applications that do not implement goal manager 202 and are external to goal management system 190 (see FIG. 1), such as planning software 228 and calendar software 230. Goal manager 202 also automatically communicates with goal-setter 204, 206 by email 232 or other electronic means to provide goal management information such as the nearness of a target date or due date, or a previously provided source of inspiration to motivate the goal-setter to achieve the goal being managed by Goal Manager 202.

Overview of Managing Goals

Figure 3:
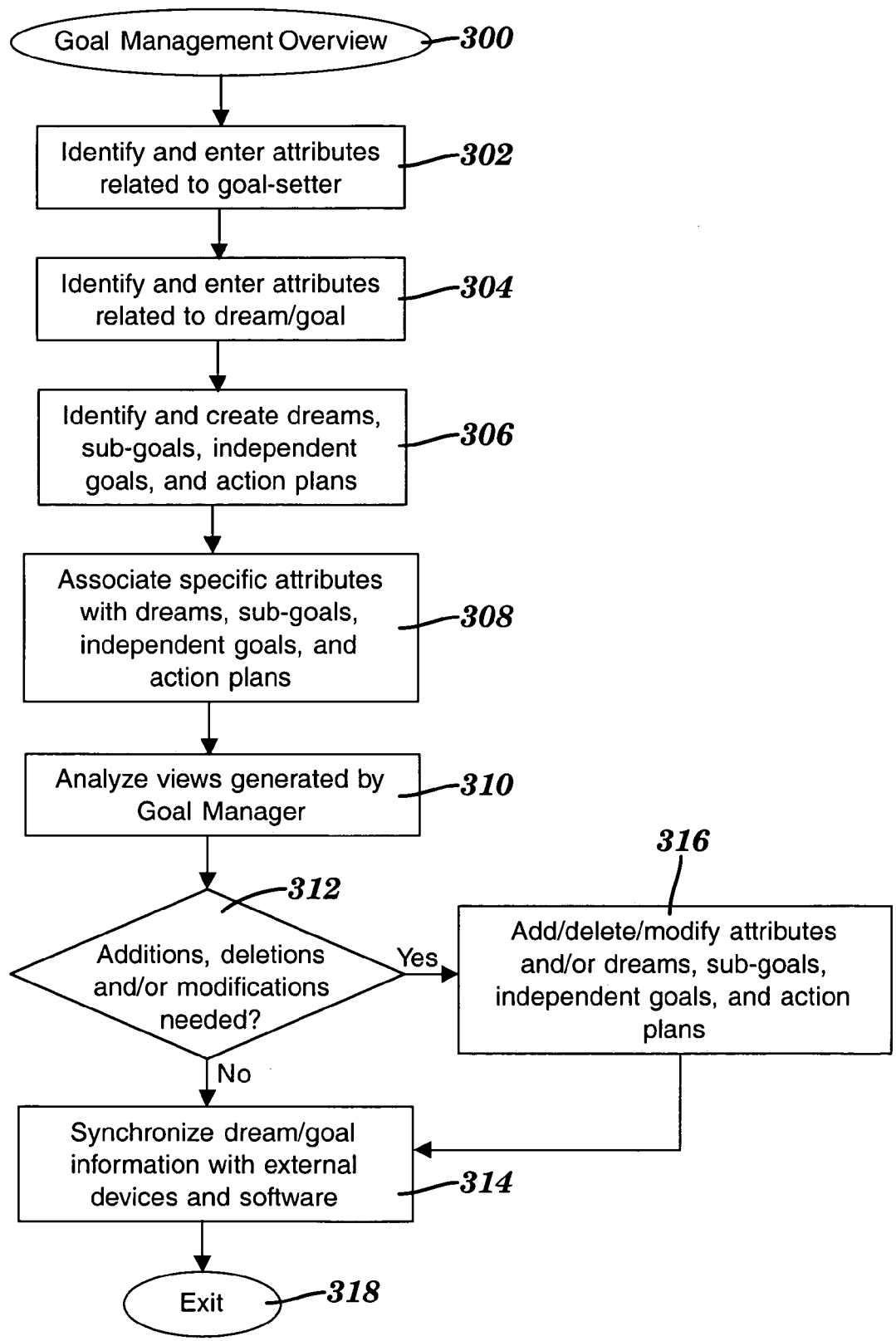
FIG. 3 is a flow chart showing an overview of a goal management method that can be implemented in the system in FIG. 1 and that can employ the architecture in FIG. 2, in accordance with embodiments of the present invention.

FIG. 3 is a flow chart showing an overview of a goal management method that can be implemented in the system in FIG. 1 and that can utilize the architecture in FIG. 2, in accordance with embodiments of the present invention. An overview of a goal management method 300 begins in step 302 with a goal-setter identifying and entering attributes related to the goal-setter (i.e., goal-setter attributes). Again, these goal-setter attributes include, for example, values, strengths, weaknesses, and sources of inspiration. The definition of a value can include a ranking level, which indicates how important that value is to the goal-setter. For example, a goal-setter may define two values: "Family" and "Financial security", and rank "Family" higher than "Financial security" (i.e., Family is more important to the goal-setter than Financial security). In step 304, the goal-setter identifies and enters goal attributes, such as possible priority levels to be assigned to goals. The identification of the above-referenced goal and goal-setter attributes may be done with or without the utilization of software, but the "entering" of such attributes refers to using goal management system 190 (see FIG. 1). The goal-setter, in step 306, identifies and defines (i.e., creates or sets) dreams, sub-goals, independent goals, as well as action plans associated therewith. Again, the defining uses goal management system 190 (see FIG. 1). In step 308, goal-setter 204, 206 (see FIG. 2) uses goal management system 190 (see FIG. 1) to associate one or more goal-setter attributes with a dream, sub-goal, independent goal and/or action. This associating provides a linkage between, for example, one or more values espoused by the goal-setter and a goal defined by the goal-setter.

In step 310, the goal-setter analyzes views generated by Goal Manager 202. These views include information that facilitates the management of goals defined by the goal-setter. For example, a view may list the number of goals associated with each of the values defined by the goal-setter. If this view indicates that the goal-setter's value of "Family" has 2 goals associated with it and the value of "Financial security" has 5 goals associated with it, the goal-setter's analysis of the view may determine that there is a lack of balance in the goal-setter's life which requires management of goals (i.e., management of goal management information).

Inquiry step 312 determines if additions, deletions and/or modifications are needed for any goal management information. This determination uses, for example, the analysis in step 310. If no additions, deletions or modifications are needed in step 312, step 314 optionally synchronizes (either automatically or by goal-setter action) goal management information with external devices (e.g., PDAs) and/or software (e.g., planning or calendar software). Returning to step 312, if additions, deletions or modifications are needed, step 316 adds, deletes, or modifies goal management information (e.g., dreams, goals, sub-goals, actions, goal attributes, and goal-setter attributes, and the associations therebetween). In the example above relative to step 310, the goal-setter's assessment of the imbalance of values and goals may lead to a decision to add, in step 316, more goals related to the value of "Family" so that the number of goals related to "Family" exceeds the number of goals related to the value of "Financial security." An addition, deletion or modification of goal management information in step 316 can be optionally followed by the synchronization of goal management information as described above (step 314). Following the synchronization step 314, this goal management overview process ends at step 318.

Defining Goal Manager Preferences

Figure 4A:
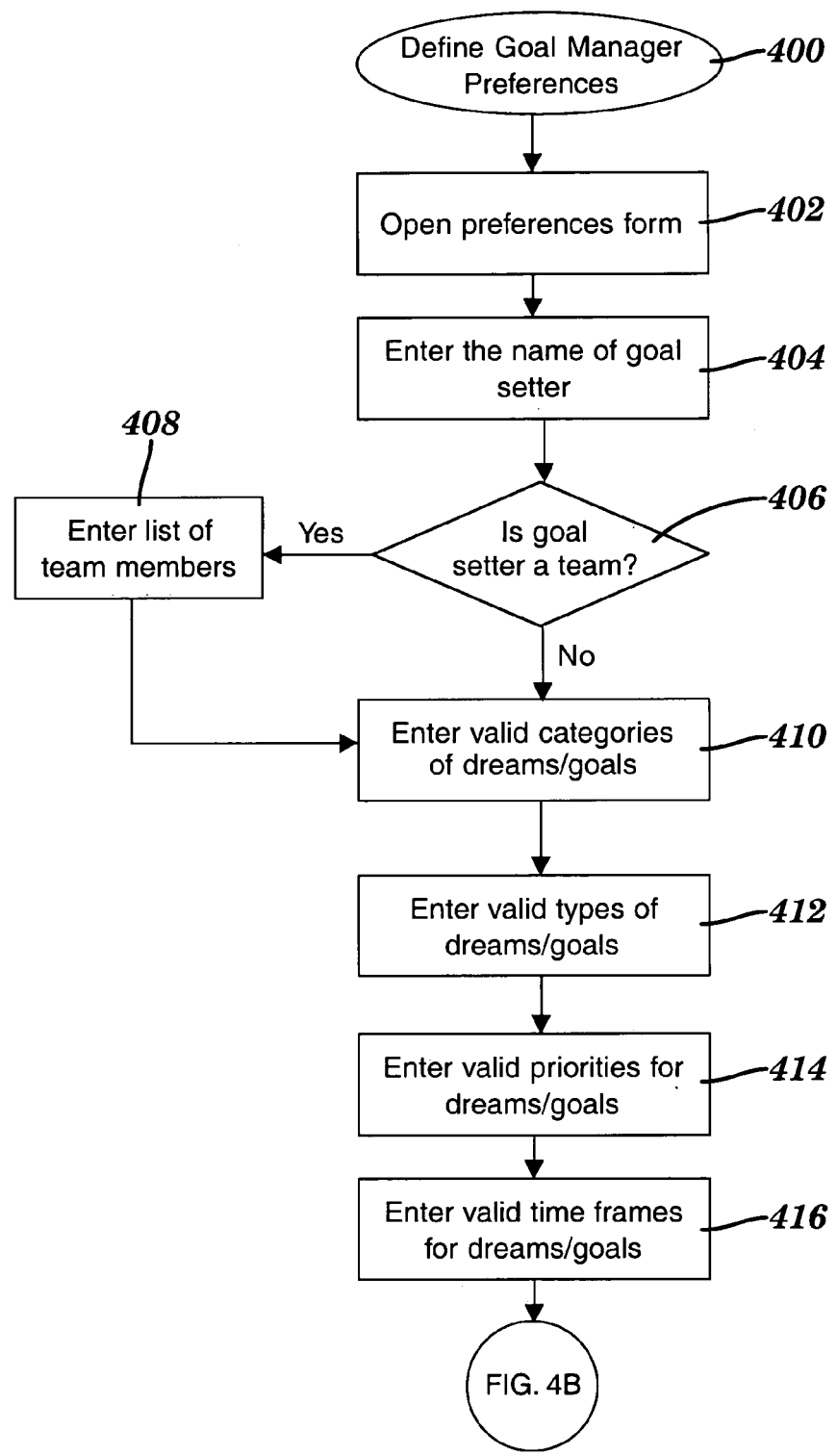
FIGS. 4A-4B depict a flow chart showing a method of defining Goal Manager preferences for the goal management method in FIG. 3, in accordance with embodiments of the present invention.
Figure 4B:
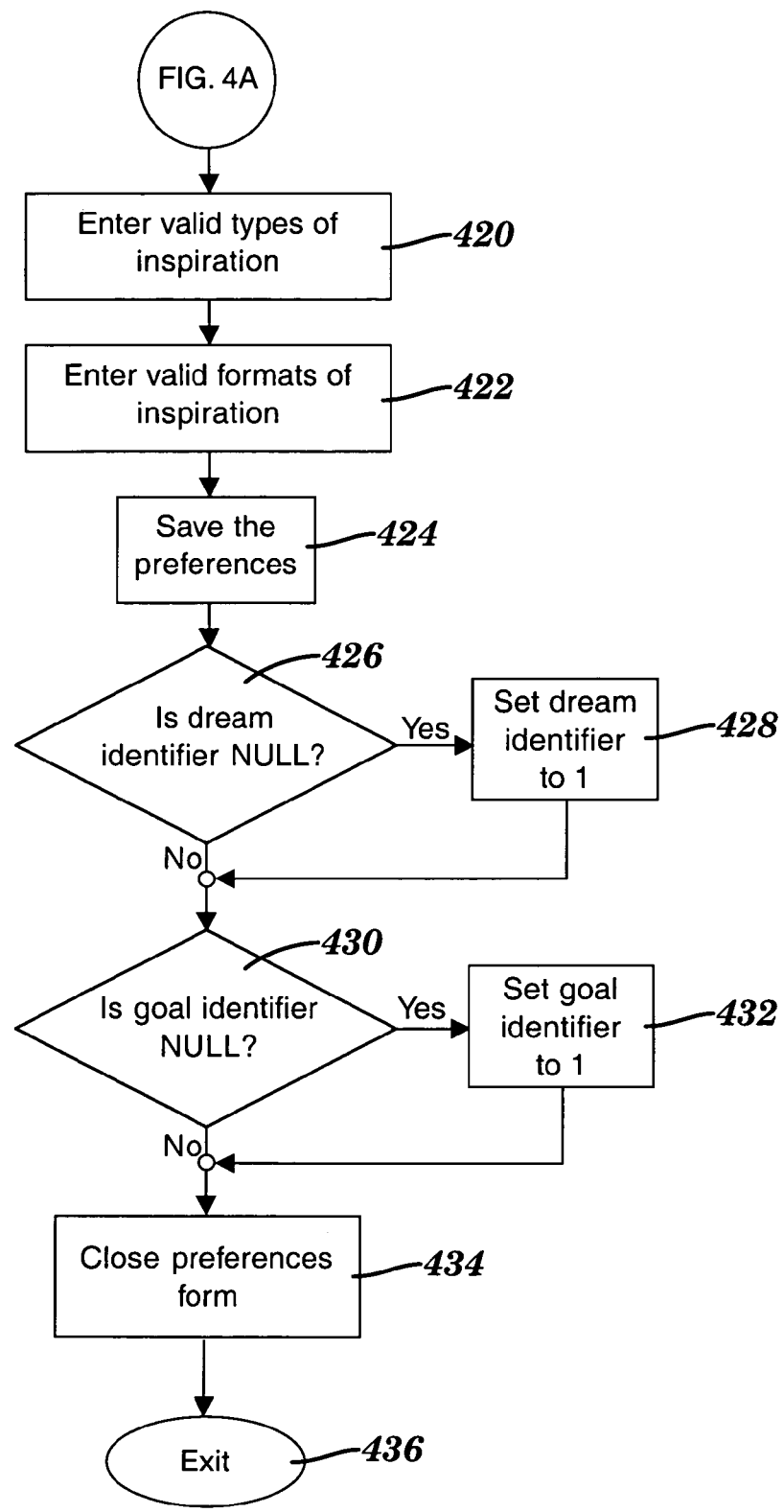

FIGS. 4A-4B depict a flow chart of a method of defining Goal Manager preferences for the goal management method in FIG. 3, in accordance with embodiments of the present invention. In step 400 of FIG. 4A, a Goal Manager preferences definition method begins and a preferences form is opened by the goal-setter in step 402. In step 404, the goal-setter enters the name of the goal-setter. In inquiry step 406, it is determined if the goal-setter is a team. If the goal-setter is a team, a list of the team's members is entered in step 408. Following step 408, or if the goal-setter is not a team as determined by step 406, valid categories of dreams, sub-goals and independent goals are entered in step 410. A category is a classification that represents an area of the goal-setter's life, such as career, economic, health, personal and social. In step 412, the goal-setter enters valid types of dreams, sub-goals and independent goals. These types are classifications that indicate the scope of effect of the dream, sub-goal or independent goal. For example a dream can have a type of "individual" if its scope is limited to the individual goal-setter, or have a type of "family" if the dream's scope of effect is the family of the goal-setter. In step 414, valid priority levels (a.k.a. priorities) for dreams, sub-goals and independent goals are entered. Priority levels indicate the relative urgency of achieving different goals. In step 416, valid time frames for goals are entered by the goal-setter. A time frame indicates the period of time during which a goal is to be achieved. Examples of time frames include 1, 5, and 10 to indicate numbers of years, and "L" to indicate that a goal is to be achieved sometime during the lifetime of the goal-setter. The Goal Manager preferences definition method continues in FIG. 4B.

FIG. 4B, the Goal Manager preferences definition method that began in FIG. 4A continues at step 420, in which valid types of inspiration are entered. For example, the goal-setter can enter Person, Place, Movie, Music, Book, Event, and Quotation as the types of inspiration. In step 422, valid formats of inspiration are entered. For instance, the goal-setter can enter electronic multimedia file formats such as jpeg, avi, mpeg, mp3, wav, etc. In step 424, the preferences are saved in goal management system 190 (see FIG. 1). The goal management system assigns an identifier to each dream and to each independent goal. Inquiry step 426 determines if the dream identifier is NULL. If the dream identifier is NULL, the dream identifier is set to 1 1n step 428. Following the dream identifier being set to 1 in step 428, or if the dream identifier is determined to be not NULL in step 426, inquiry step 430 determines if the goal identifier is NULL. If the goal identifier is NULL, the goal identifier is set to 1 in step 432. Following step 432 or if the goal identifier is determined to be not NULL in step 430, the preferences form is closed in step 434 and the Goal Manager preferences definition method ends in step 436.

Figure 4C:
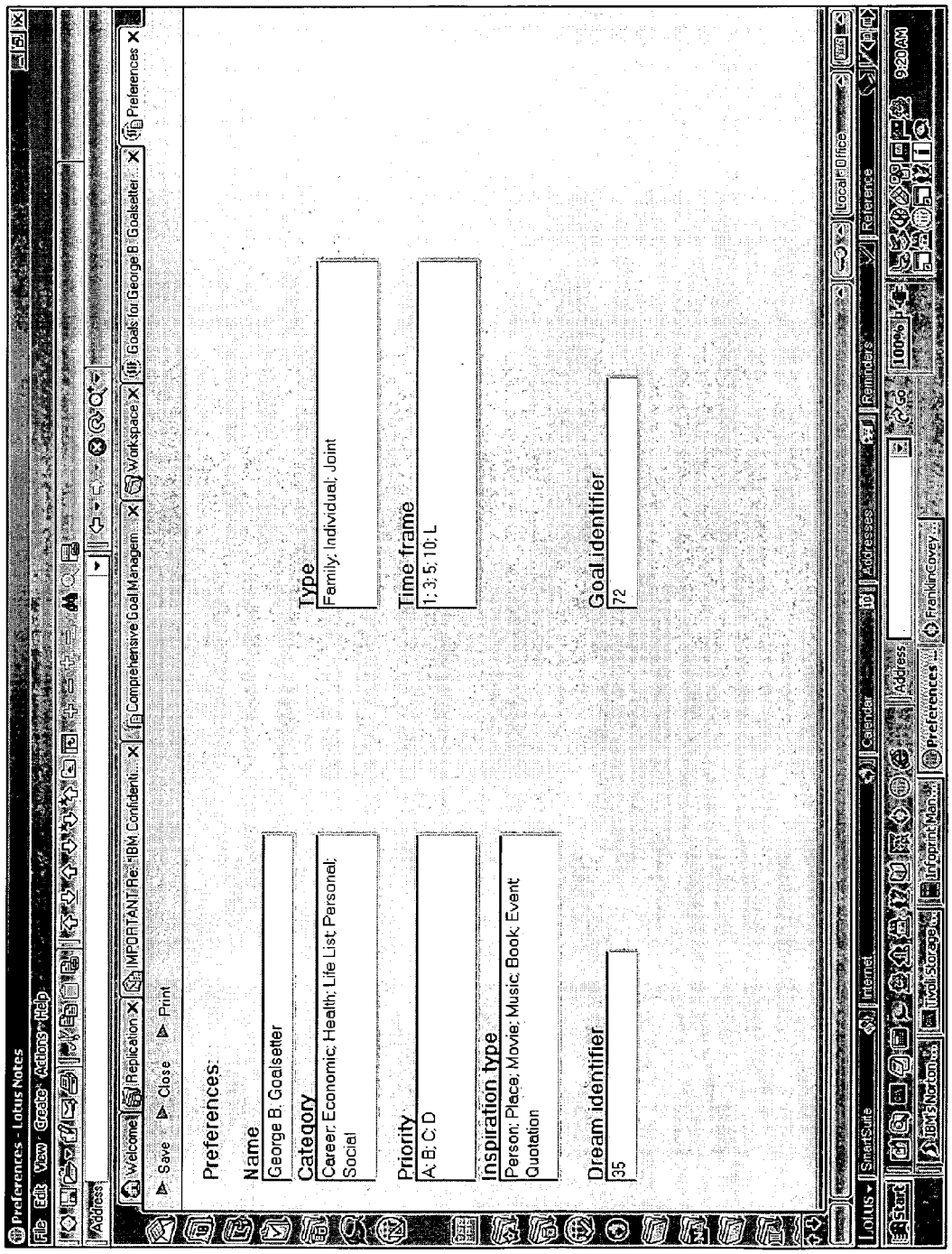
FIG. 4C is a screen capture of an example of a preferences definition form to be employed by the method of defining preferences in FIGS. 4A-4B, in accordance with embodiments of the present invention.

FIG. 4C is a screen capture of an example of a preferences definition form to be employed by the method of defining preferences in FIGS. 4A-4B, in accordance with embodiments of the present invention. The sample preferences definition form in FIG. 4C includes fields for entering the following items: name of the goal-setter (step 404), valid categories to be associated with dreams, sub-goals and independent goals (step 410), valid types to be associated with dreams, sub-goals and independent goals (step 412), valid priority levels to be associated with dreams, sub-goals and independent goals (step 414), valid time frames to be associated with dreams, sub-goals and independent goals (step 416), and valid types of inspiration (step 420). Although not shown, the preferences definition form can include a field for entering the valid formats of the sources of inspiration (step 422). The dream identifier field and goal identifier field provide identifiers that link the preferences entries to the identified dream and goal. The dream and goal identifiers are each automatically initialized (e.g., to the value of 1). Each time a dream or goal is created on a dream or goal creation form, the corresponding dream or goal identifier is automatically incremented by one and stored on the preferences definition form. Dream and goal creation forms are discussed below relative to FIGS. 10A-10C and 11A-11D.

Defining Goal-Setter Attributes

Figure 5A:
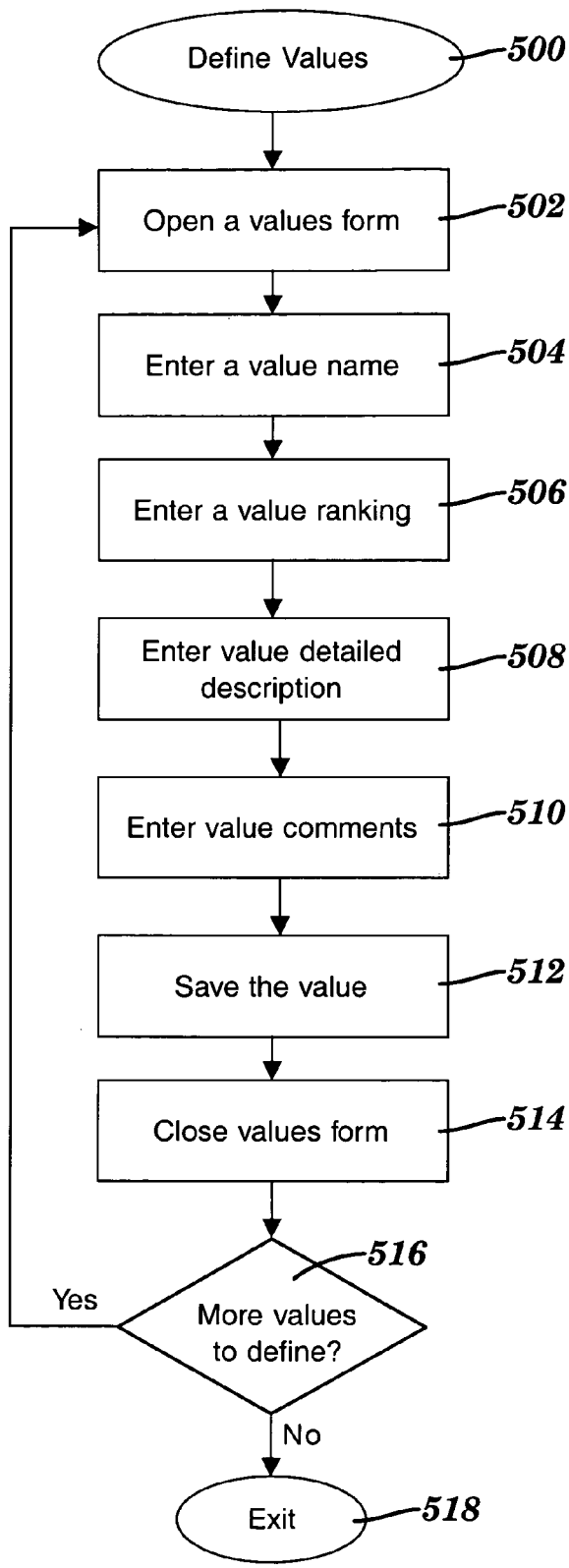
FIG. 5A is a flow chart showing a method of defining values of a goal-setter for the goal management method in FIG. 3, in accordance with embodiments of the present invention.

FIG. 5A is a flow chart showing a method of defining values of a goal-setter for the goal management method in FIG. 3, in accordance with embodiments of the present invention. The method of defining values begins in step 500, which is followed by opening a values form in step 502. In step 504, a value name is entered. For example, the goal-setter can enter "Family" as the name of a value. Goals associated with this "Family" value can be, for instance, goals associated with one or more aspects of the goal-setter's family. In step 506, the value named in step 504 is assigned a ranking level. For example, the goal-setter can assign a "1" as the ranking level for the "Family" value to indicate that the goal-setter considers the "Family" value to be the most important value. In this example, a higher number for a value's ranking level indicates a lower level of importance attached to the value.

In step 508, the value being defined is described in detail. Any other comments relative to the value being defined can be entered in step 510. The value being defined is saved in goal management system 190 (see FIG. 1) in step 512. In step 514, the values definition form is closed. Inquiry step 516 determines if an another value is to be defined. If another value is being defined, the process described above repeats starting at step 502. If no other value needs to be defined, the value definition method ends in step 518.

Figure 5B:
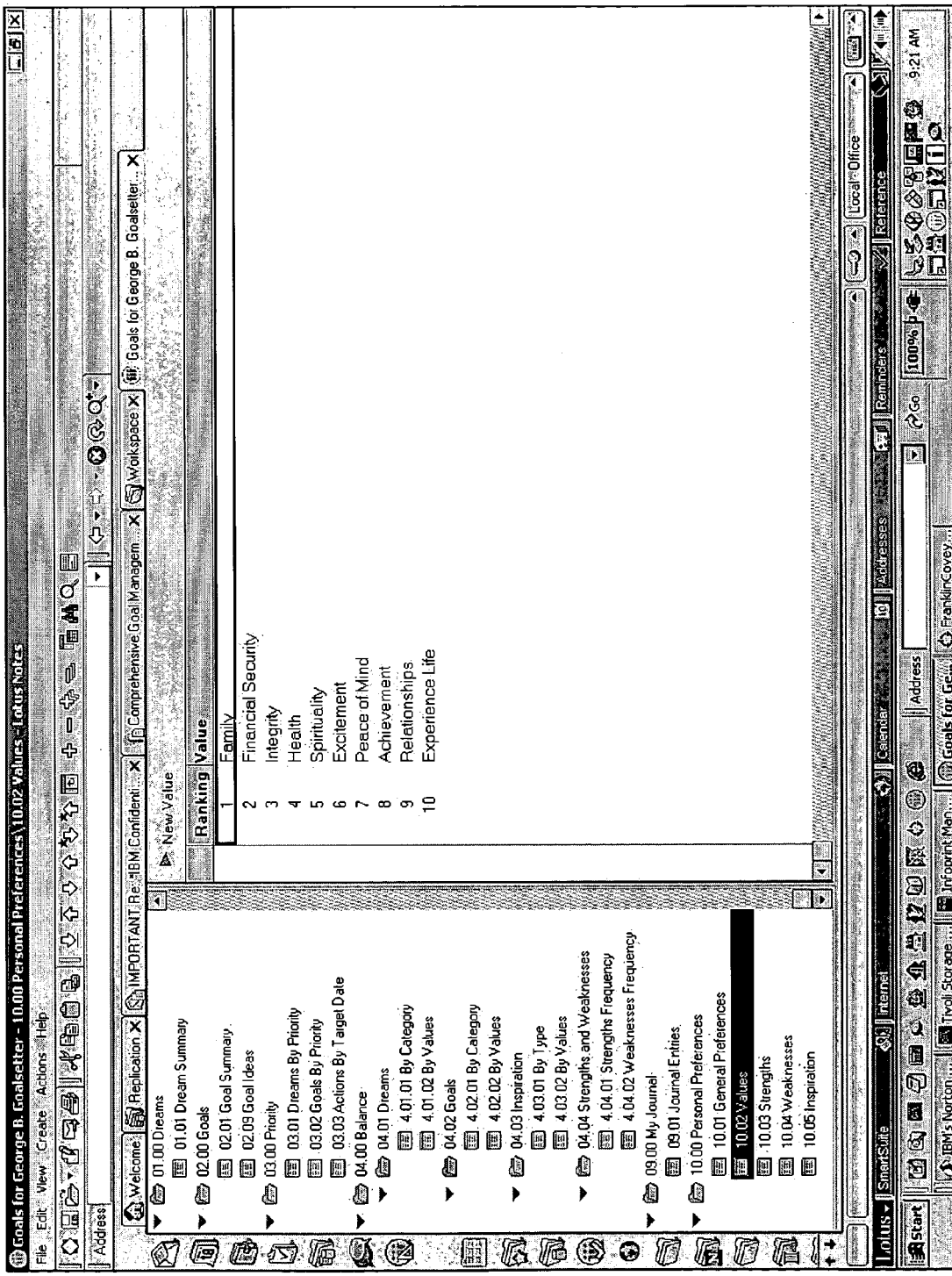
FIG. 5B is a screen capture of a listing of values and their associated ranking levels, as defined by the method of defining values in FIG. 5A, in accordance with embodiments of the present invention.

FIG. 5B is a screen capture of a listing of values and their associated ranking levels, as defined by the method of defining values in FIG. 5A, in accordance with embodiments of the present invention. The values listing in FIG. 5B includes a list of the names of the values specified in step 504 (see FIG. 5A) along with their corresponding ranking levels specified in step 506 (see FIG. 5A).

Figure 6:
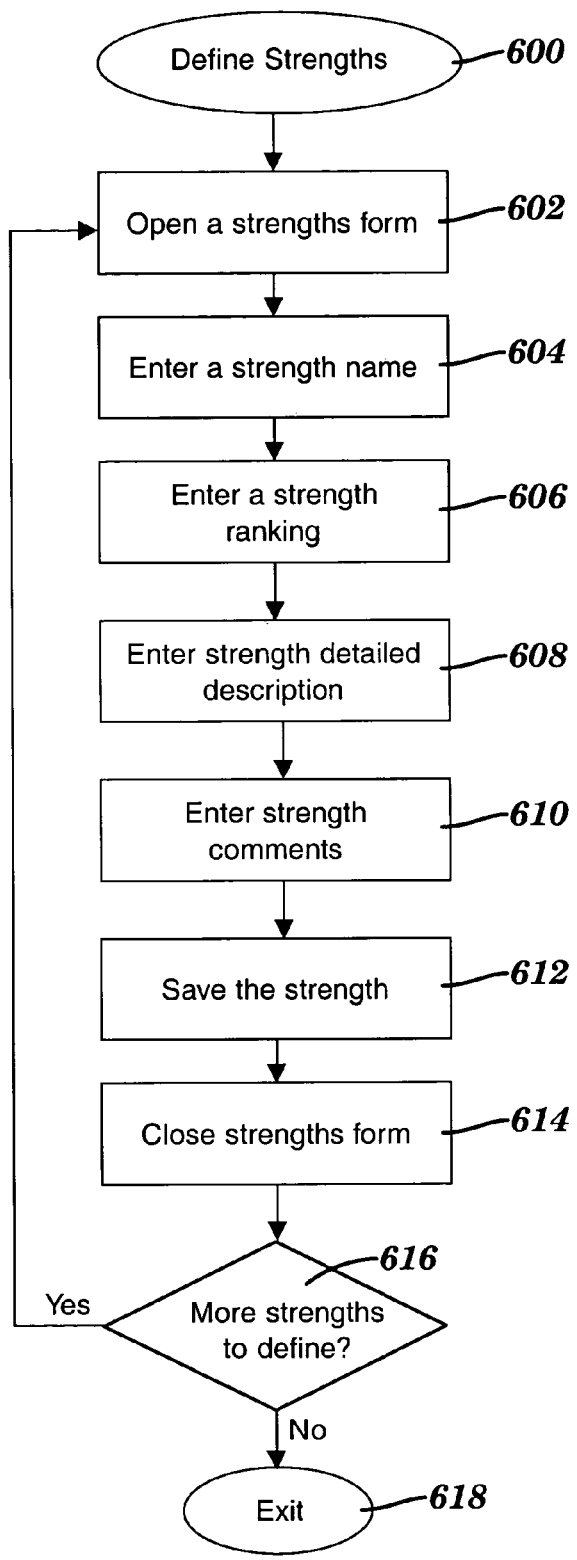
FIG. 6 is a flow chart showing a method of defining strengths of a goal-setter for the goal management method in FIG. 3, in accordance with embodiments of the present invention.

FIG. 6 is a flow chart showing a method of defining strengths of a goal-setter for the goal management method in FIG. 3, in accordance with embodiments of the present invention. In step 602, a strengths definition form is opened to define a strength of the goal-setter. In step 604, a name for the strength being defined is entered on the strengths definition form. In step 606, a ranking level for the strength being defined is entered on the strengths definition form. The ranking level indicates the level of impact that a strength has on the goal-setter's life. For example, to indicate that a strength named "high energy level" has the most impact on the goal-setter's life, the goal-setter can assign the highest ranking level of "1" to that strength. In this example, higher numbers for ranking levels indicate strengths that have less impact. A goal-setter can use strength ranking levels to exploit the goal-setter's greatest (i.e., highest ranked) strengths to achieve goals. A detailed description of the strength being defined is entered in step 608 and any additional comments relative to the strength can be entered in step 610. In step 612, the strength definition is saved in goal management system 190 (see FIG. 1). The strengths definition form is closed in step 614. Inquiry step 616 determines if another strength definition is required. If another strength definition is needed, the method described above repeats starting at step 602. If inquiry step 616 determines that no other strengths need to be defined, then the strength definition method ends at step 618.

Figure 7:
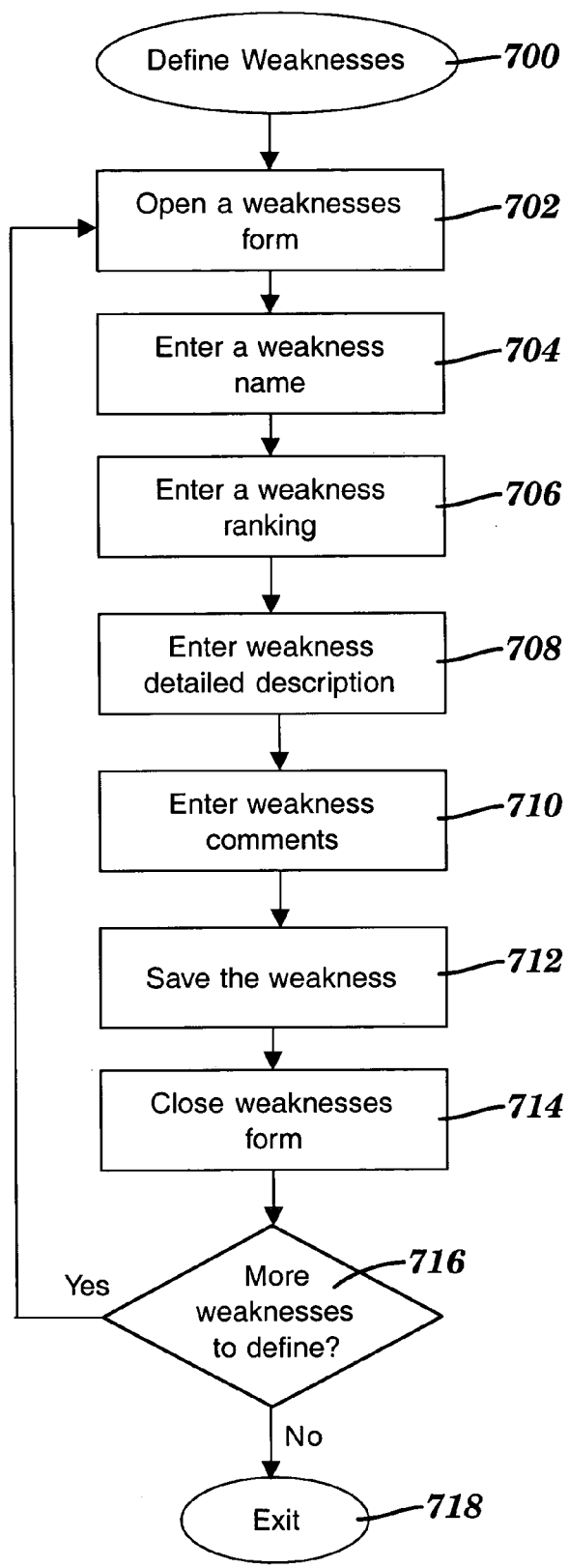
FIG. 7 is a flow chart showing a method of defining weaknesses of a goal-setter for the goal management method in FIG. 3, in accordance with embodiments of the present invention.

FIG. 7 is a flow chart showing a method of defining weaknesses of a goal-setter for the goal management method in FIG. 3, in accordance with embodiments of the present invention. In step 702, a weaknesses definition form is opened to define a weakness of the goal-setter. In step 704, a name for the weakness being defined is entered on the weaknesses definition form. In step 706, a ranking level for the weakness being defined is entered on the weaknesses definition form. The ranking level indicates the level of impact that a weakness has on the goal-setter's life. For example, to indicate that a weakness named "procrastination" has the most impact on the goal-setter's life, the goal-setter can assign the highest ranking level of "1" to that weakness. In this example, higher numbers for ranking levels indicate weaknesses that have less impact. A goal-setter can use weakness ranking levels to determine which weaknesses need to be persistently and aggressively improved upon. A detailed description of the weakness being defined is entered in step 708 and any additional comments relative to the weakness can be entered in step 710. In step 712, the weakness definition is saved in goal management system 190 (see FIG. 1). The weaknesses definition form is closed in step 714. Inquiry step 716 determines if another weakness definition is required. If another weakness definition is needed, the method described above repeats starting at step 702. If inquiry step 716 determines that no other weaknesses need to be defined, then the weaknesses definition method ends at step 718.

Figure 8:
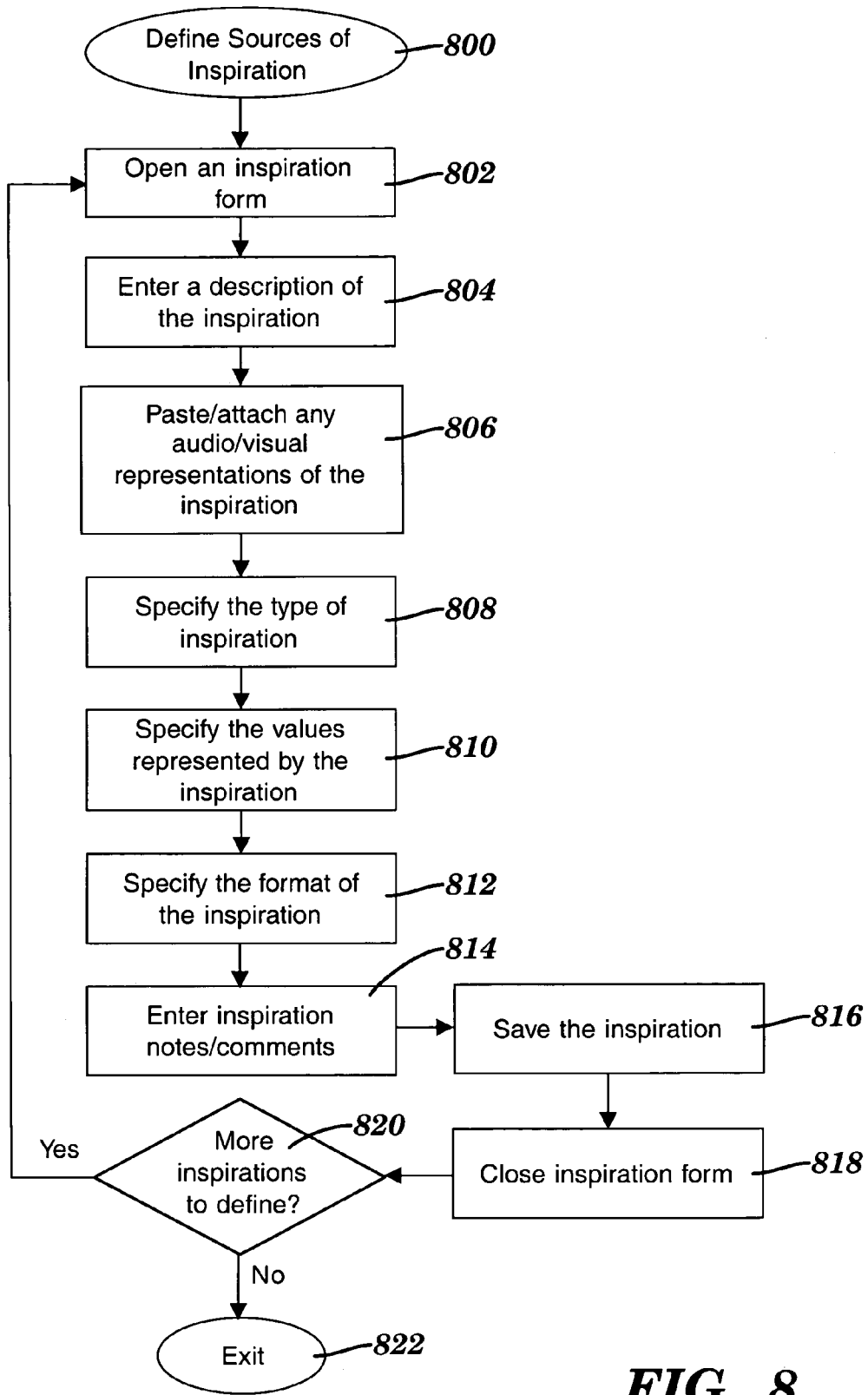
FIG. 8 is a flow chart showing a method of defining sources of inspiration of a goal-setter for the goal management method in FIG. 3, in accordance with embodiments of the present invention.

FIG. 8 is a flow chart showing a method of defining sources of inspiration of a goal-setter for the goal management method in FIG. 3, in accordance with embodiments of the present invention. The definition of sources of inspiration 800 begins with opening an inspiration definition form in goal management system 190 (see FIG. 1) in step 802. In step 804, a description of the inspiration is entered in the form. In step 806, one or more audio/visual representations of the source of the inspiration are pasted or attached. For example, if Abraham Lincoln is a source of inspiration for the goal-setter, the goal-setter can attach a jpeg file that includes an image of Lincoln. In step 808, the type of the inspiration is specified. The type is, for example, selected from the valid types of inspiration defined in step 420 of FIG. 4B. For example, the valid inspiration types of Book, Event, Movie, Music, Person and Place may be presented to the goal-setter, who can select Person to be the type associated with the "Abraham Lincoln" source of inspiration. In step 810, one or more values represented by the inspiration are specified. The values are selected from the values defined in the method described above relative to FIG. 5A. In step 812, the format of the inspiration source is specified. For example, the valid formats defined in step 422 of FIG. 4B are presented to the goal-setter, who can select jpeg to identify the file format of the image of the Lincoln source of inspiration being defined. In step 814, comments relative to the source of inspiration being defined can be entered. The definition of the inspiration is saved in the goal management system in step 816. In step 818, the inspiration definition form is closed. If inquiry step 820 determines that another source of inspiration needs to be defined, the method described above repeats starting at step 802. When inquiry 820 determines that no other inspirations need to be defined, the inspiration definition method ends in step 822.

Overview of Creating Dreams, Sub-Goals Independent Goals & Actions

Figure 9A:
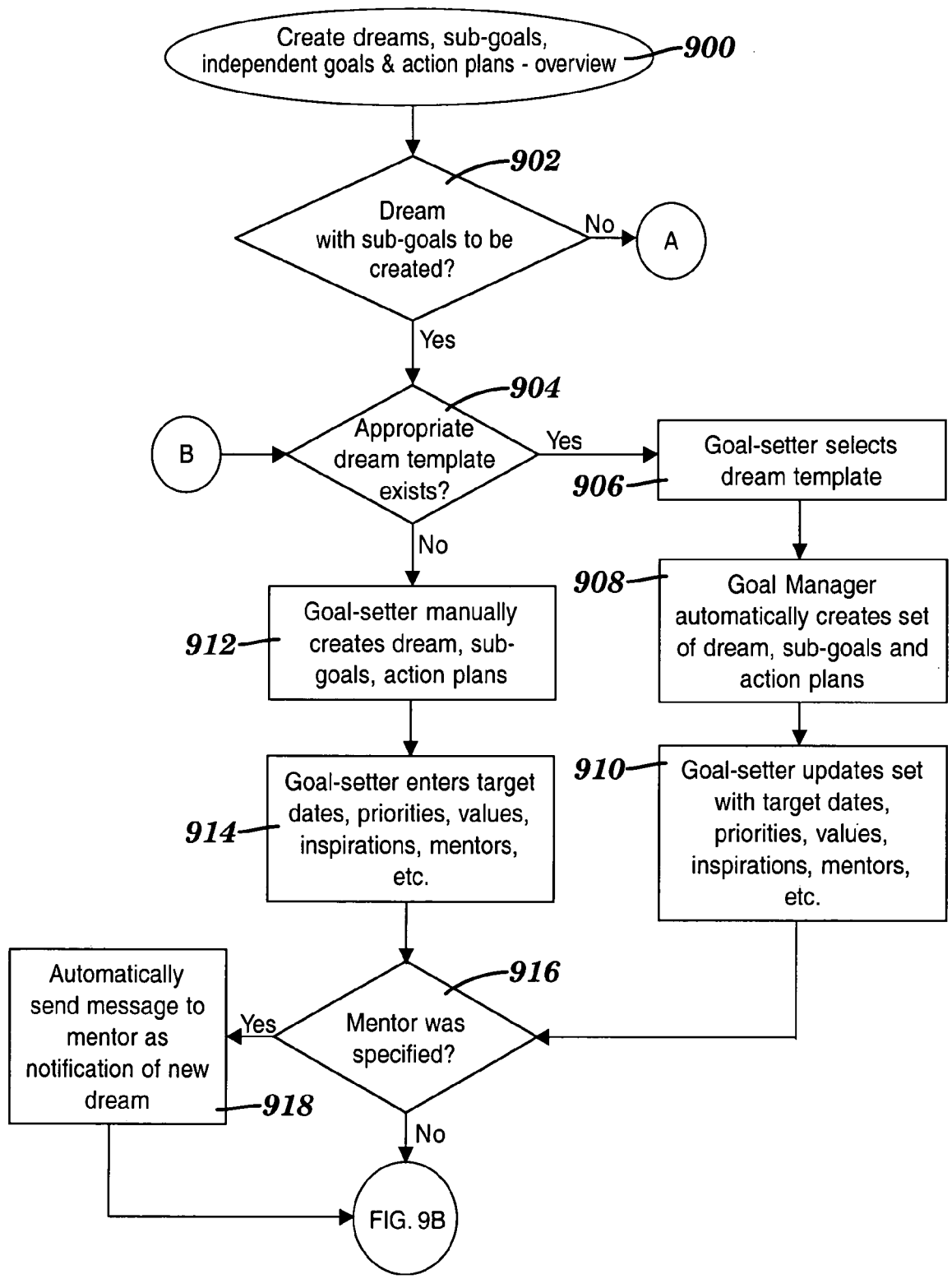
FIGS. 9A-9C depict a flow chart showing a method of creating dreams, sub-goals, independent goals and action plans for the goal management method in FIG. 3, in accordance with embodiments of the present invention.
Figure 9B:
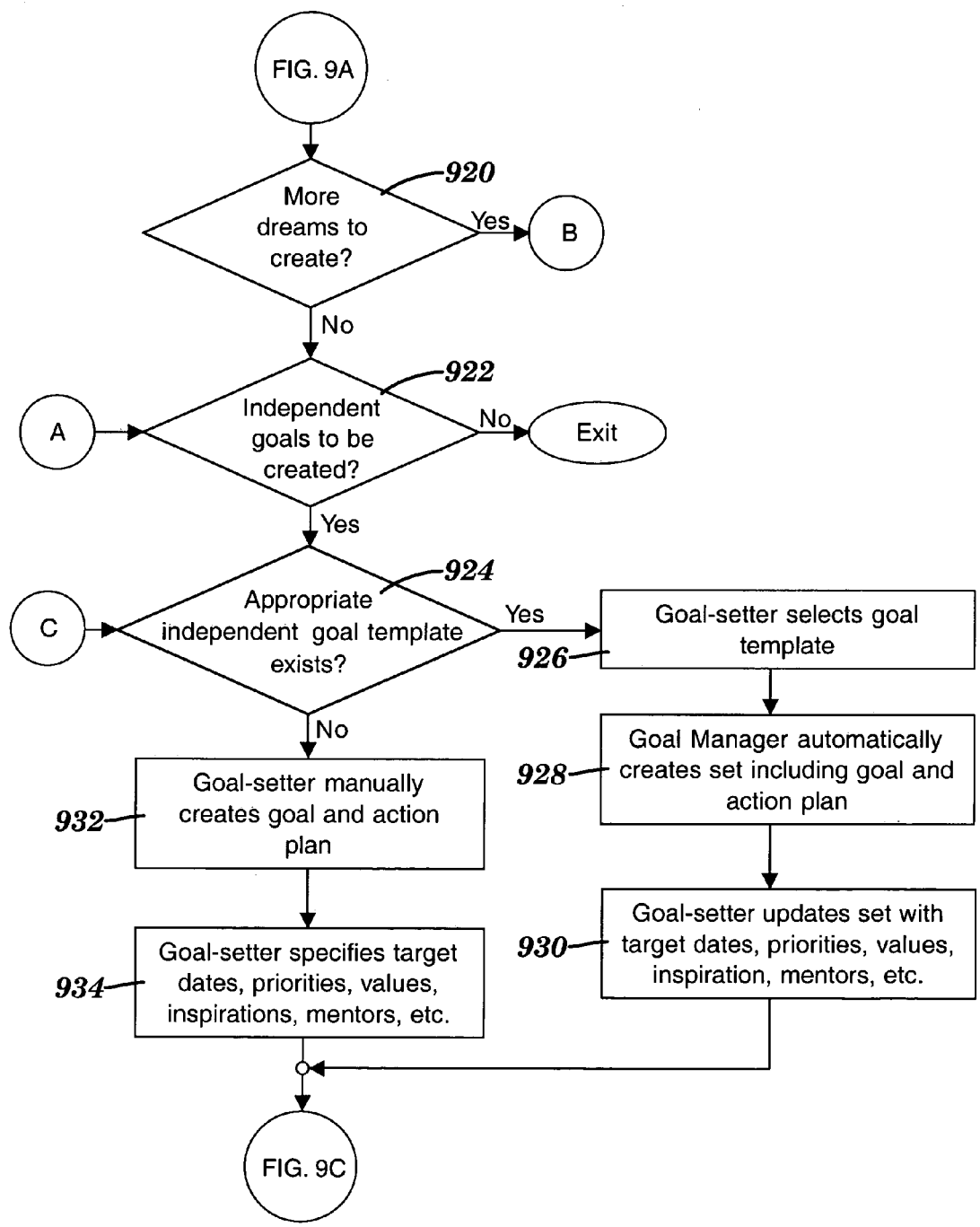
Figure 9C:
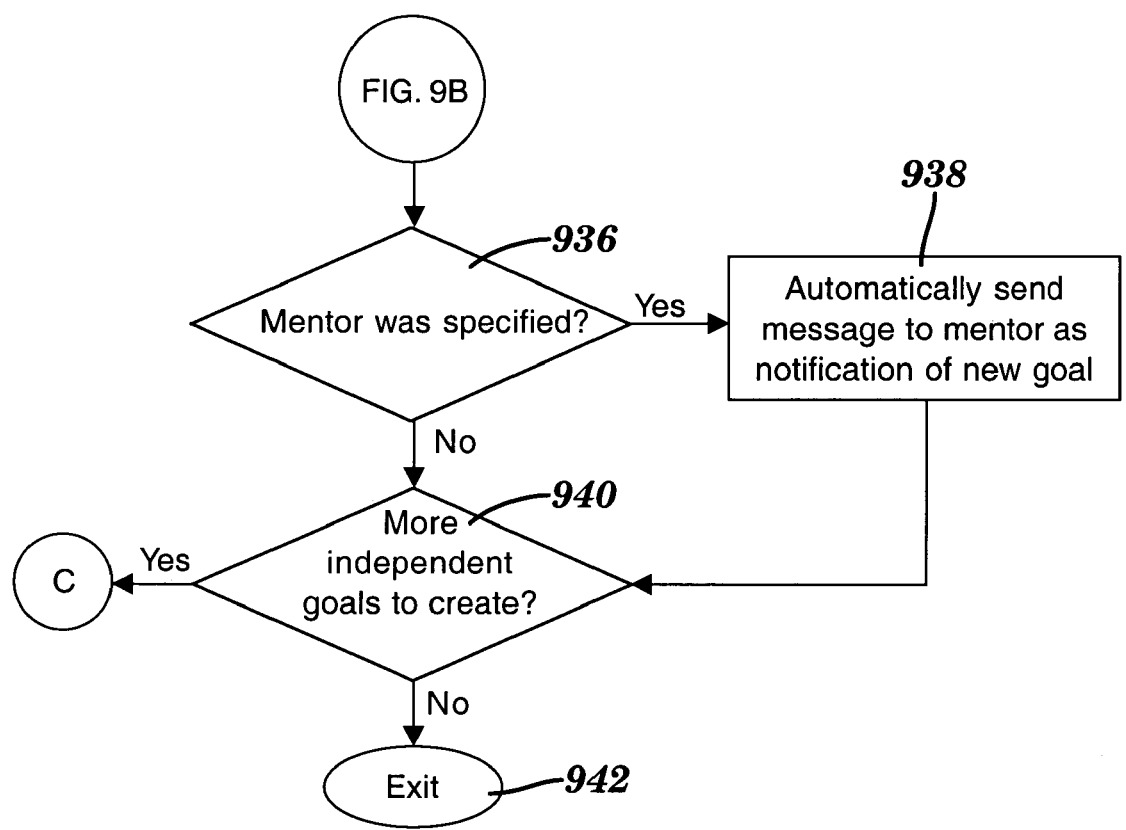

FIGS. 9A-9C depict a flow chart showing an overview method of creating dreams, sub-goals, independent goals and/or action plans for the goal management method in FIG. 3, in accordance with embodiments of the present invention. Hereinafter, the flow chart depicted in FIGS. 9A-9C is referred to simply as the overview creation method. The overview creation method begins in step 900 in FIG. 9A and continues with an inquiry step 902 that determines whether a dream needs to be created. If a dream is to be created, another inquiry step 904 determines if an appropriate dream template exists. If the appropriate dream template exists, the goal-setter selects the dream template (step 906), the Goal Manager automatically creates a set that includes a dream, sub-goals, and action plans (step 908), and the goal-setter then updates the set in step 910 by providing target dates for the dream and sub-goals, target dates for the actions in the action plan, priority levels for the dream and sub-goals, and associates at least one value and inspiration with the dream being created. The goal-setter also has the option in step 910 to associate at least one mentor with the dream. Returning to inquiry step 904, if an appropriate dream template does not exist, the goal-setter manually creates the dream, sub-goals and action plans (step 912) and enters the target dates for the dream and sub-goals, the target dates for the actions in the action plan, and associates at least one value and inspiration with the dream (step 914). The goal-setter also has the option in step 914 to associate at least one mentor with the dream being created.

After entering goal and goal-setter attributes in step 914 or updating the template to include the specific attributes in step 910, an inquiry step 916 determines if a mentor was specified by the goal-setter as being associated with the dream being created. If such a mentor was specified in step 914 or step 910, then in step 918 the Goal Manager automatically sends a message (e.g., email) to the mentor to notify the mentor of the newly created dream.

Following step 918, or if inquiry step 916 determines that no mentor was specified, the overview creation method continues in FIG. 9B with inquiry step 920. If additional dreams are to be created as determined by inquiry step 920, then the process described above is repeated starting at step 904. If inquiry step 920 determines that no other dreams are to be created, inquiry step 922 follows to determine if an independent goal needs to be created. Inquiry step 922 also follows if inquiry step 902 determines that creation of a dream is not needed. If creation of an independent goal is required in step 922, and if inquiry step 924 determines that an appropriate independent goal template exists, then the goal-setter selects the goal template (step 926), the Goal Manager automatically creates a set including the goal and action plan (step 928) and the goal-setter updates the set with target dates for the goal and actions in the action plan, a priority level for the goal, and associates at least one value and inspiration with the goal being defined (step 930). In step 930, the goal-setter also has the option of associating at least one mentor with the goal being defined.

Returning to inquiry step 924, if an appropriate independent goal template does not exist, the goal-setter manually creates the goal and action plan (step 932), specifies target dates, and the goal's priority level, and associates at least one value and inspiration to the goal being defined (step 934). In step 934, the goal-setter also has the option of associating at least one mentor with the goal being defined.

Following steps 930 and 934, the overview creation method continues in inquiry step 936 in FIG. 9C. If inquiry step 936 determines that step 930 or 934 associated-a mentor with the goal being defined, then the Goal Manager automatically sends a message (e.g., email) to the mentor to notify the mentor of the newly created independent goal. Following step 938, or if inquiry step 936 determines that no mentor was specified, inquiry step 940 determines if more independent goals need to be created. If additional independent goals are required, the process described above is repeated starting at step 924. If no more independent goals need to be created in step 940, the overview creation method ends in step 942. This overview creation method also ends if inquiry step 922 (see FIG. 9B) determines that no independent goals need to be created.

Creating Dreams

Figure 10A:
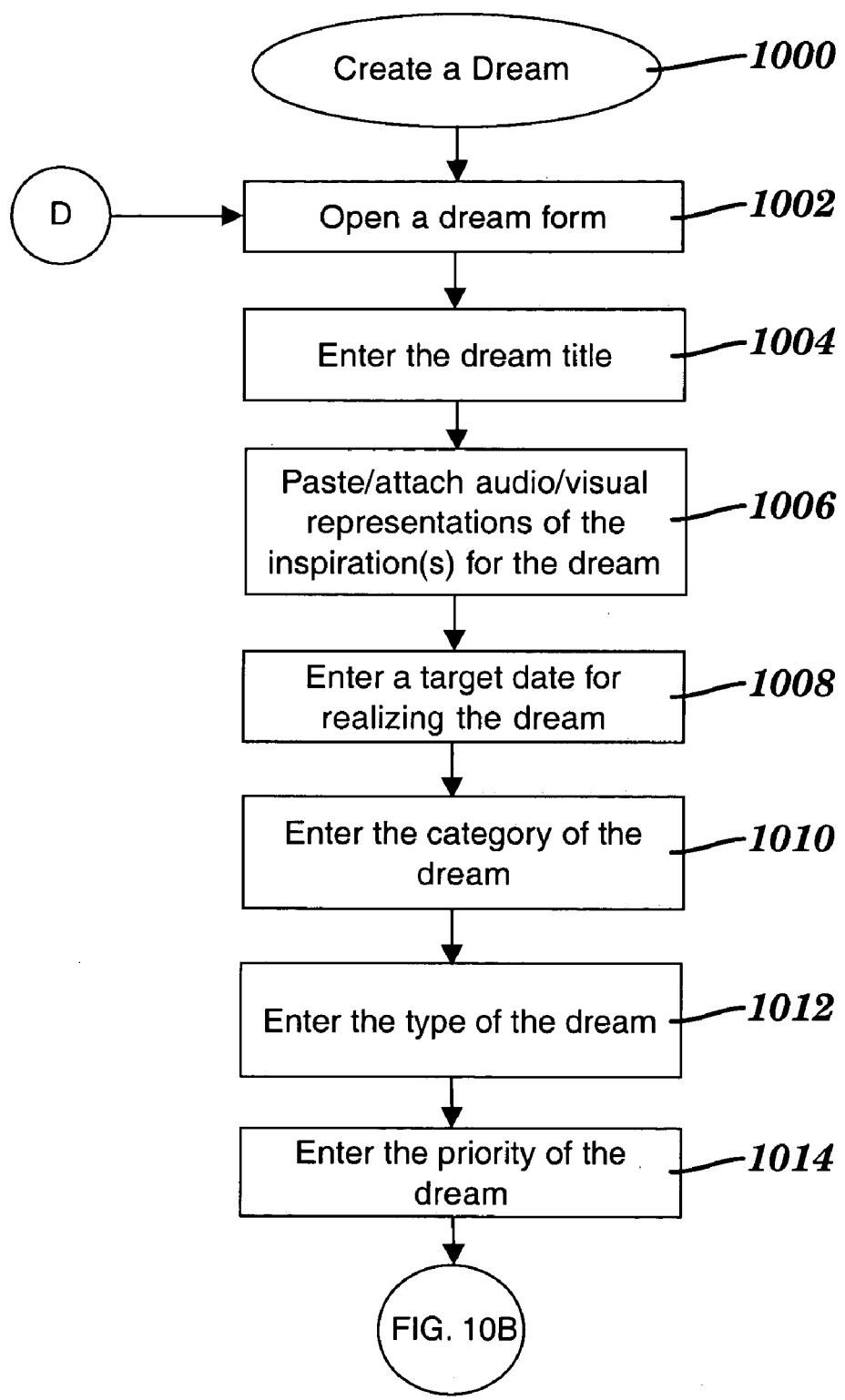
FIGS. 10A-10C depict a flow chart showing a method of creating a dream for the goal management method in FIG. 3, in accordance with embodiments of the present invention.
Figure 10B:
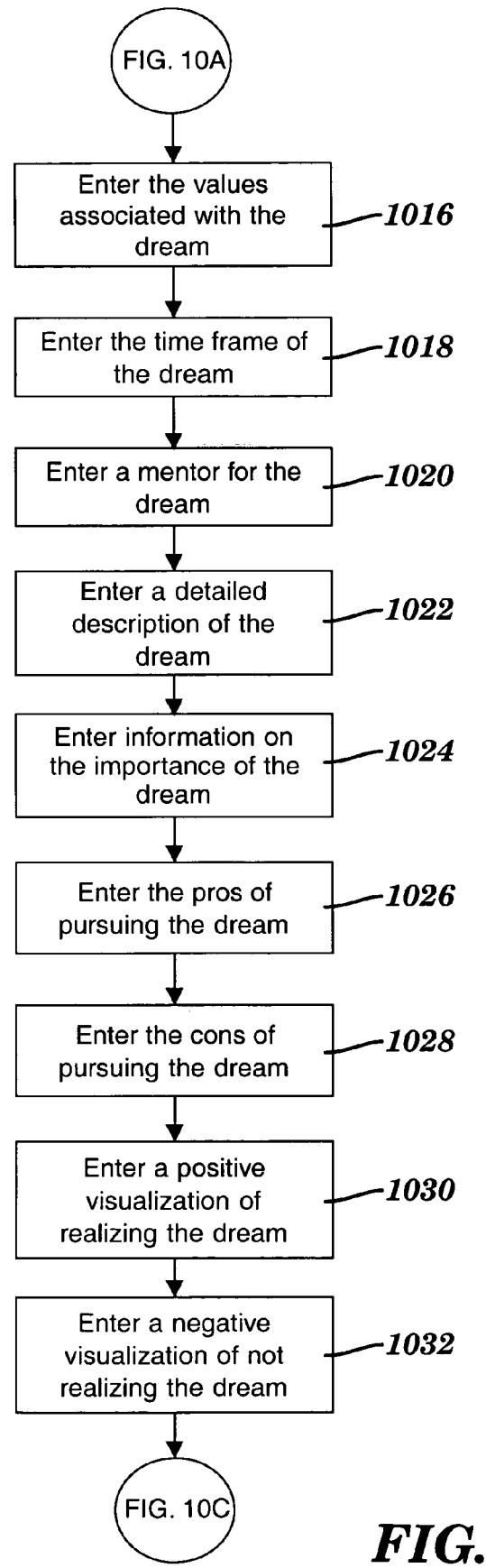
Figure 10C:
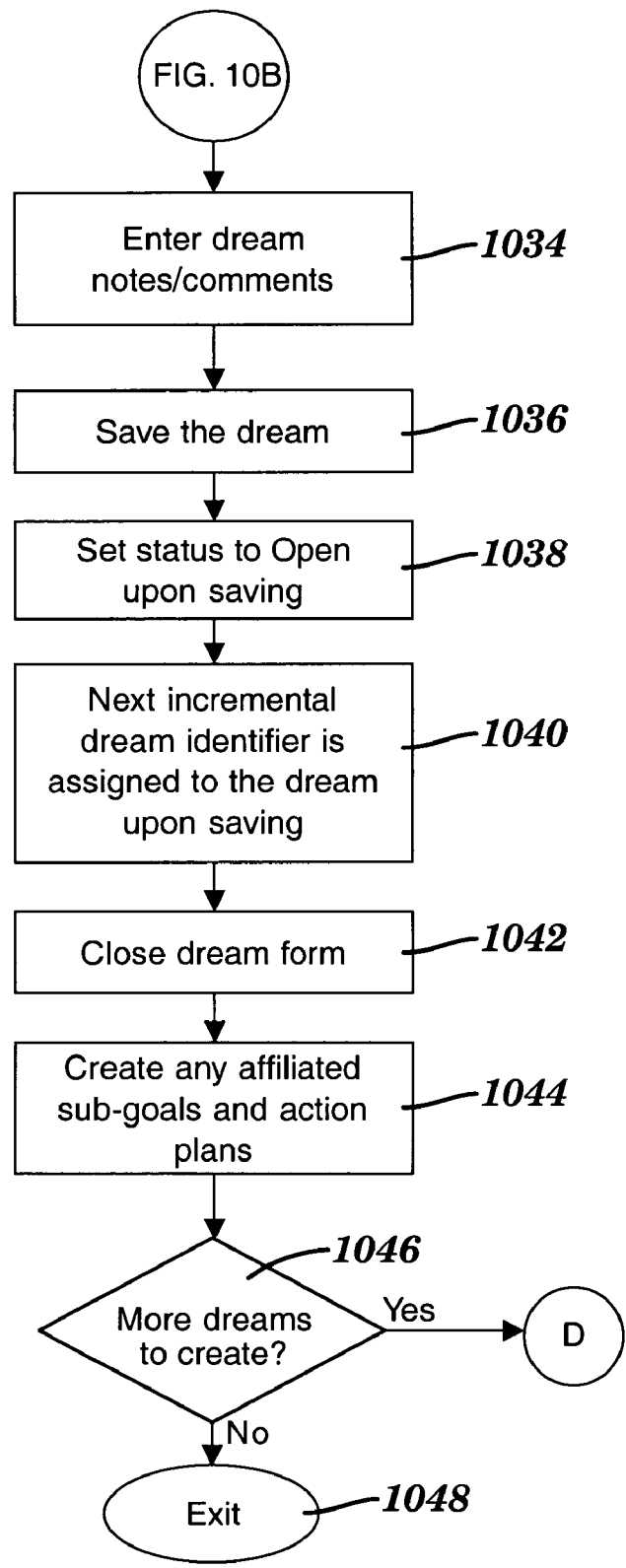

FIGS. 10A-10C depict a flow chart showing a method of creating a dream for the goal management method in FIG. 3, in accordance with embodiments of the present invention. The dream creation method begins in step 1000, followed by the opening of a dream creation form in goal management system 190 (see FIG. 1) in step 1002. The goal-setter enters the dream title on the dream creation form in step 1004. In step 1006, audio/visual representations of the inspiration(s) for the dream being created are pasted or attached. This inspiration may be pasted/attached as a multimedia electronic file in any known format (e.g., jpeg, mpeg, wav, etc.). In step 1008, the target date for realizing (i.e., achieving) the dream is entered. The category of the dream is entered in step 1010 and the type of the dream is entered in step 1012. The priority of the dream is entered in step 1014.

The dream creation method continues in FIG. 10B with step 1016, in which one or more of the goal-setter's values associated with the dream are entered on the dream creation form. The time frame in which the dream is to be realized is entered in step 1018. The goal-setter has the option in step 1020 of entering a mentor to be associated with the dream in 1020. The mentor is a third party who can provide the goal-setter with, for example, knowledge, advice, guidance and motivation relative to the dream be pursued. In step 1022, a detailed description of the dream is entered on the dream creation form. In step 1024, information relative to the importance of the dream is entered. In steps 1026 and 1028, the dream's pros and cons, respectively, are entered in the dream creation form. A positive visualization and negative visualization relative to the dream are entered in steps 1030 and 1032, respectively.

The dream creation method continues in step 1034 of FIG. 10C, in which notes and/or comments relative to the dream are entered in the dream creation form. In step 1036, the dream is saved in goal management system 190 (see FIG. 1). Upon saving the dream, the status of the dream is set to Open in step 1038, and the next incremental dream identifier is assigned to the dream in step 1040. In step 1042, the dream creation form is closed. In step 1044, sub-goals and action plans associated with the dream are created. If inquiry step 1046 determines if more dreams need to be created, the process described above is repeated starting at step 1002. If inquiry step 1046 finds that no other dreams need to be created, the dream creation method ends in step 1048.

Figure 10D:
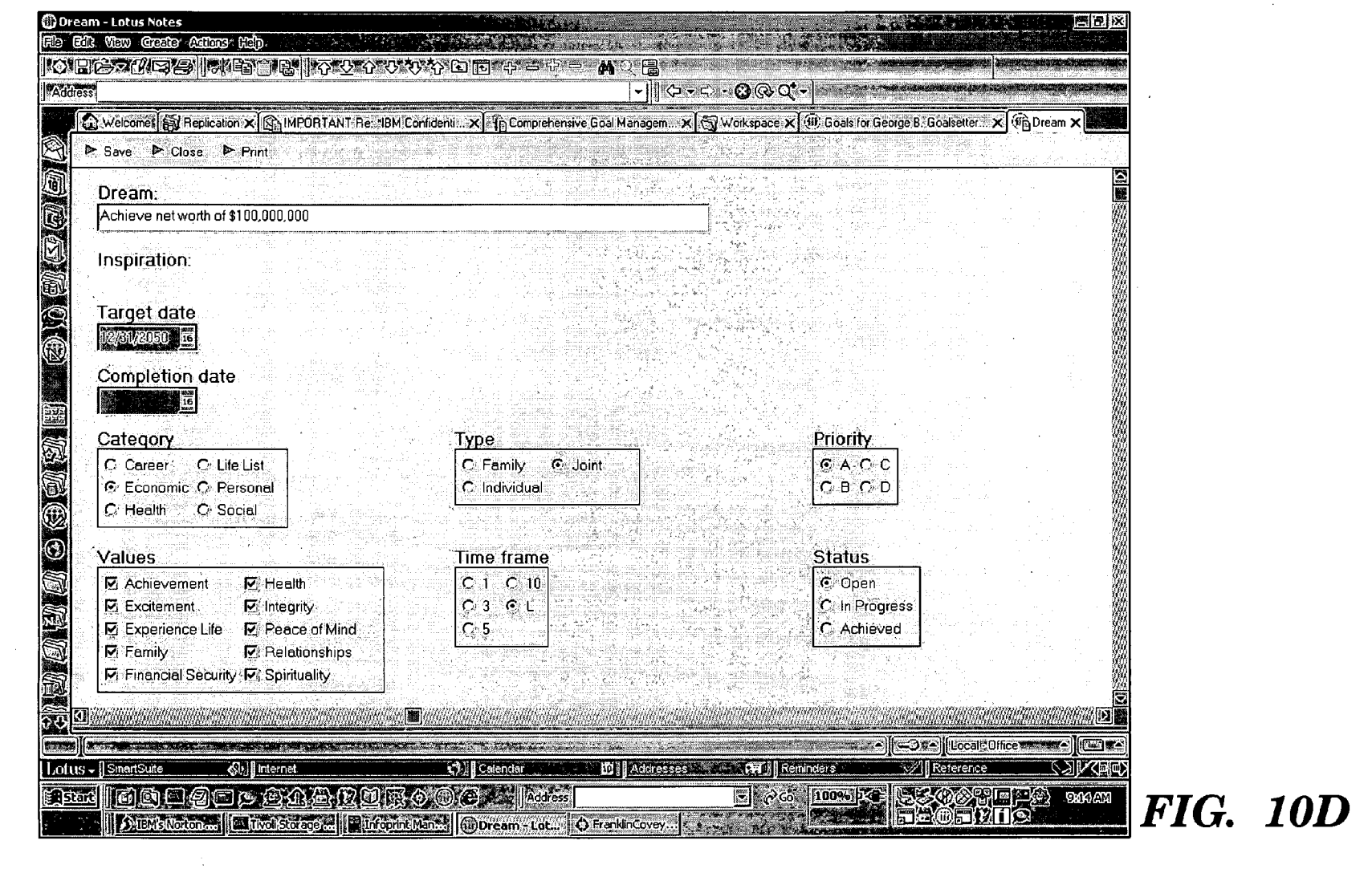
Figure 10E:
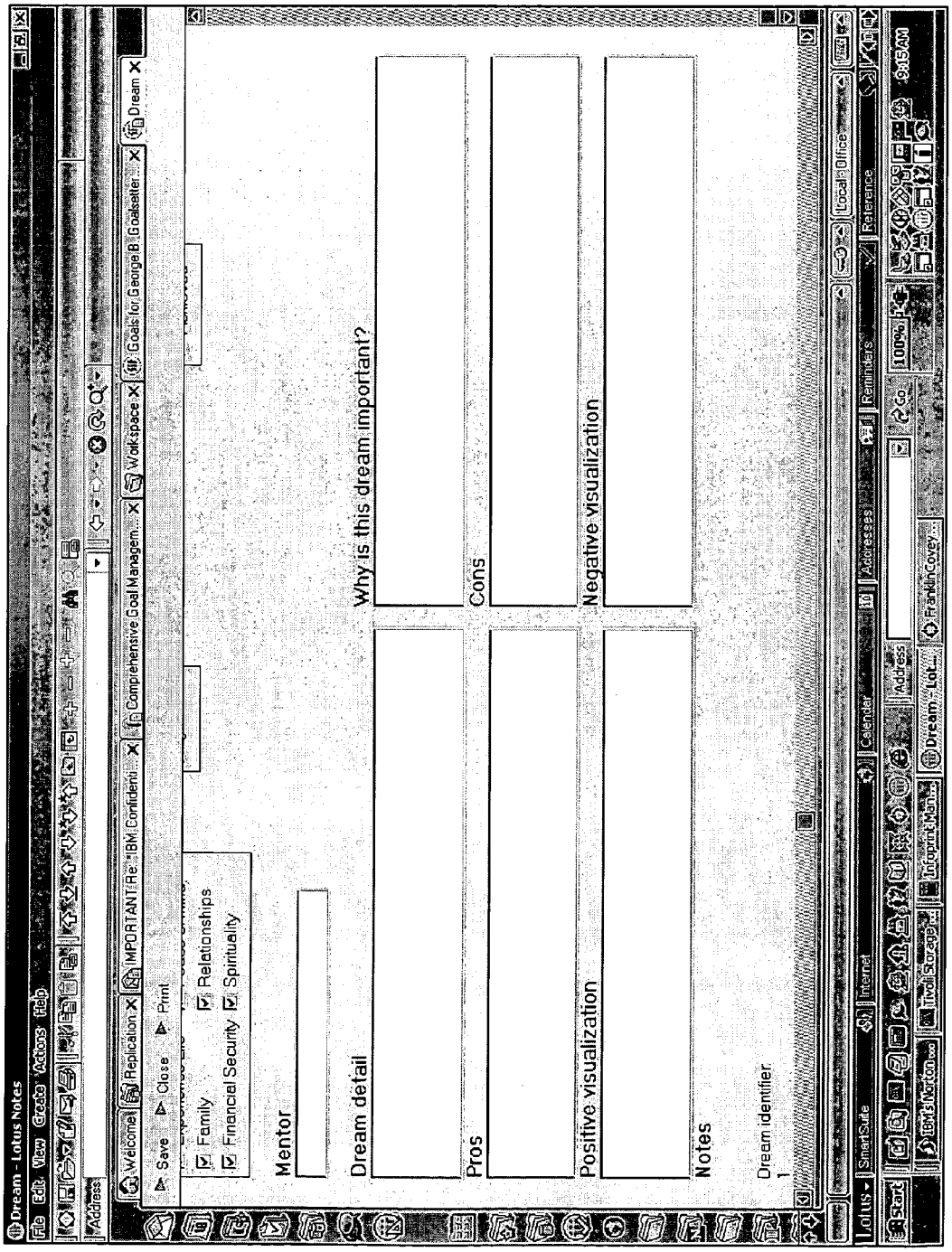

FIGS. 10D-10E are screen captures of an example of a dream creation form to be employed by the method of creating a dream in FIGS. 10A-10C, in accordance with embodiments of the present invention. The sample dream creation form in FIGS. 10D & 10E includes fields, check boxes, and radio buttons for entering or selecting the following items for the dream: a title (step 1004), target date (step 1008), category (step 1010), type (step 1012), priority level (step 1014), associated value(s) (step 1016), time frame (step 1018), associated mentor (step 1020), a detailed description of the dream (step 1022), an explanation of why the dream is important to the goal-setter (step 1024), pros and cons of pursuing the dream (steps 1026, 1028), a positive visualization of realizing the dream (step 1030), a negative visualization of not realizing the dream (step 1032), and notes and comments relative to the dream (step 1034). A location labeled Inspiration on FIG. 10D allows the pasting or attaching of an audio/visual representation of a source of inspiration related to the dream (step 1006). Upon activating the Save screen button on FIG. 10D or FIG. 10E, the Status area in FIG. 10D is set to Open (step 1038). To change the status setting, the goal-setter manually selects "In progress" or "Achieved." After the dream is realized, the goal-setter selects the "Achieved" status setting and fills in the completion date field on FIG. 10D with the date the dream was realized.

Figure 10F:
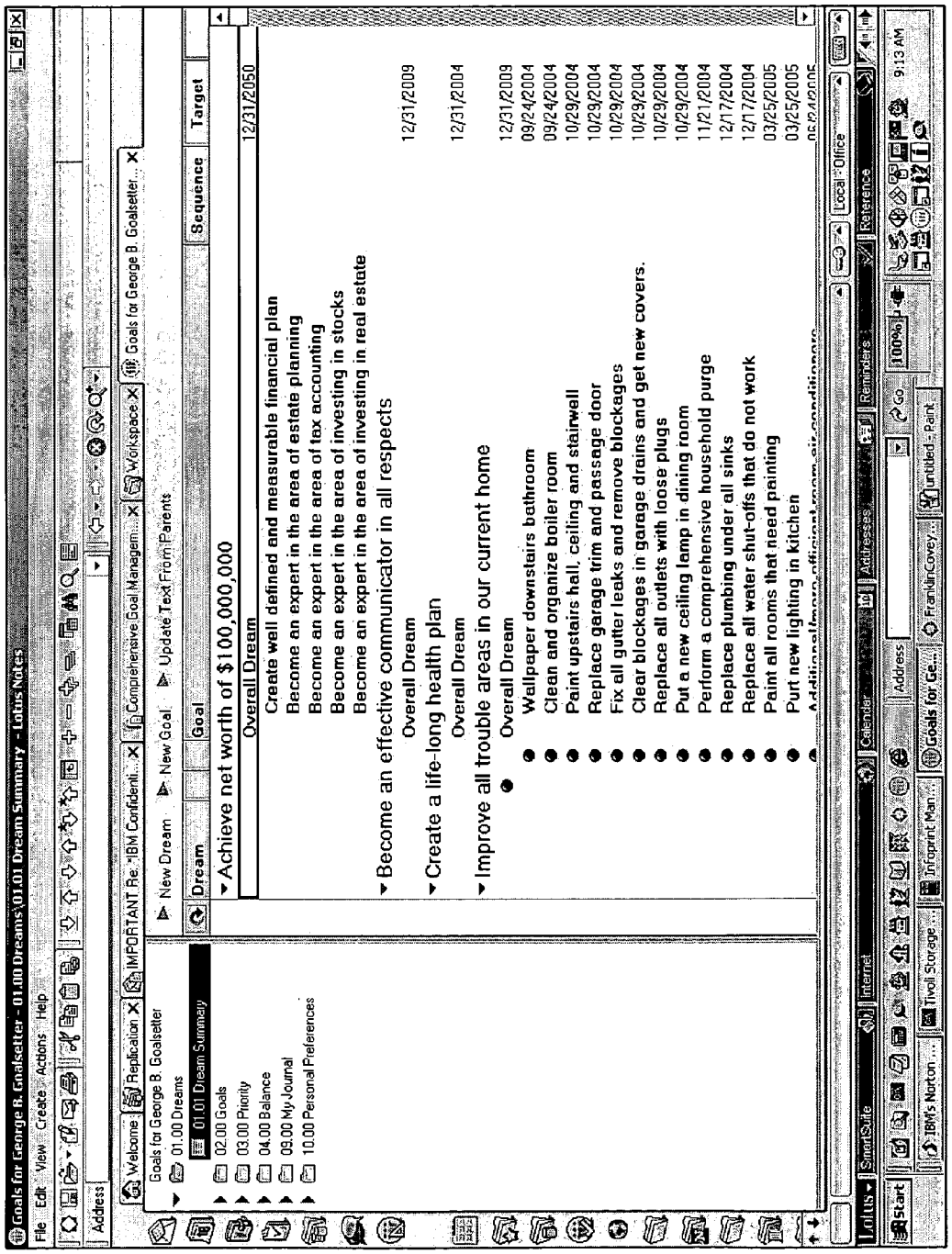
FIG. 10F is a screen capture of a summary of dreams created by the method of creating a dream in FIGS. 10A-10C, in accordance with embodiments of the present invention.

FIG. 10F is a screen capture of a summary of dreams created by the method of creating a dream in FIGS. 10A-10C, in accordance with embodiments of the present invention. The dream summary in FIG. 10F includes, for example, a list of the titles of the dreams created, sub-goal titles listed below their associated dream, target dates for each dream created, and target dates for each sub-goal associated with one of the listed dreams.

Figure 10G:
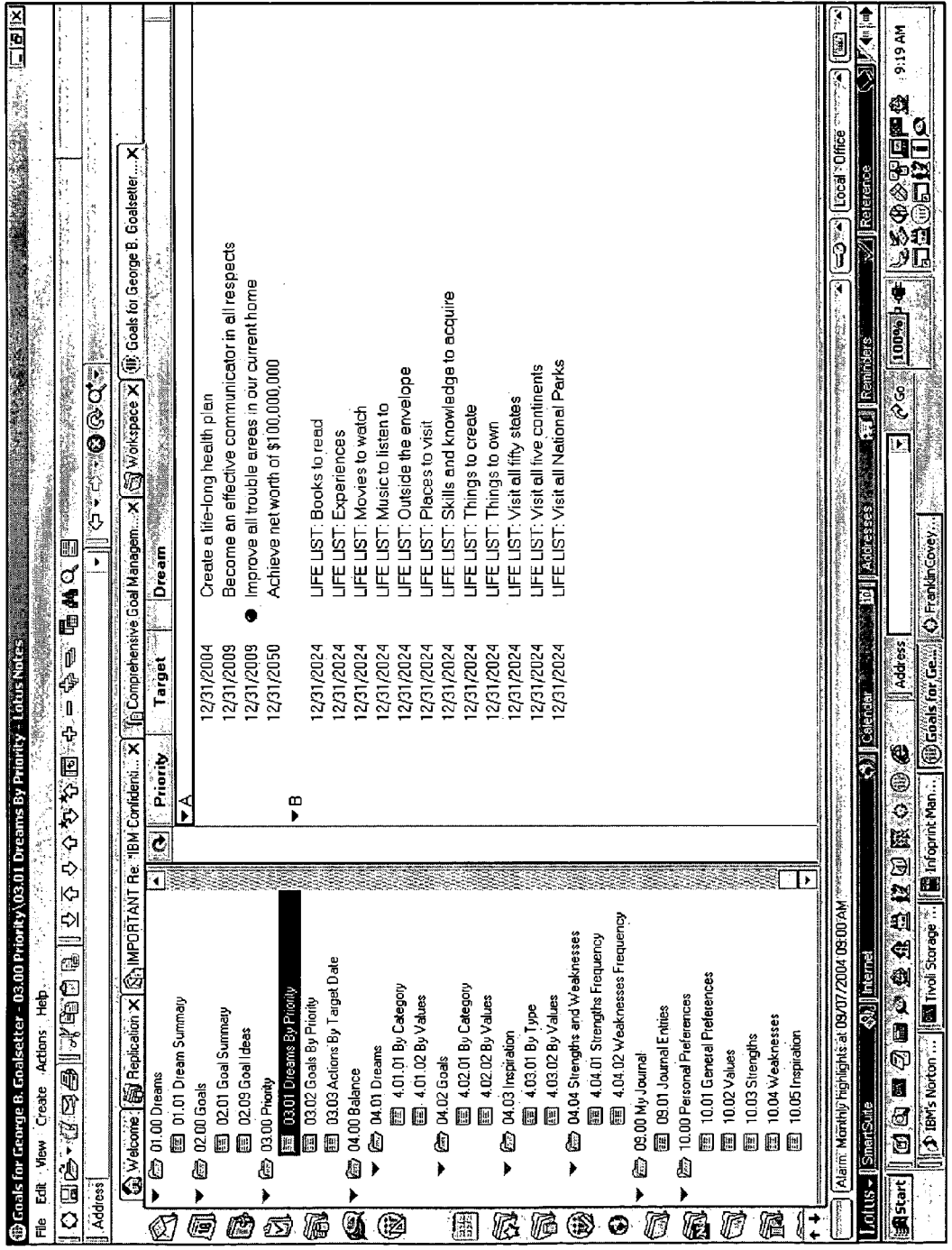
FIG. 10G is a screen capture of a Priority view (Dreams by Priority) that displays dreams grouped by priority levels assigned by the method of creating a dream in FIGS. 10A-10C and defined by the method of defining preferences in FIGS. 4A-4B, in accordance with embodiments of the present invention.

FIG. 10G is a screen capture of a Priority view (Dreams by Priority) that displays dreams grouped by priority levels assigned by the method of creating a dream in FIGS. 10A-10C and defined by the method of defining preferences in FIGS. 4A-4B, in accordance with embodiments of the present invention. The Dreams by Priority view includes a list of dreams identified by their titles and target dates. The dream list is grouped by each of the priority levels that were defined in step 414 in FIG. 4A.

Other views provided by goal management system 190 (see FIG. 1) can include goals or actions grouped by goal attributes or grouped by goal-setter attributes. These views can also include counts of the goals or actions. For example, views can include goals grouped by priority levels and actions grouped by target date. Any of these views can assist the goal-setter in managing goals. For instance, the Dreams by Priority view can help the goal-setter decide if there is sufficient time to realize high priority dreams. If the goal-setter decides that the highest priority dreams require more attention, the goal-setter can modify goal management information as necessary. For example, the goal-setter can adjust target dates to allow more time to be devoted to dreams having a high priority level.

Creating Independent Goals and Sub-Goals

FIGS. 11A-11D depict a flow chart showing a method of creating an independent goal or a sub-goal for the goal management method in FIG. 3, in accordance with embodiments of the present invention. This independent goal/sub-goal creation method begins at step 1100 in FIG. 11A, followed by inquiry step 1102. If inquiry step 1102 determines that the goal being created is to be associated with a dream (i.e., is a sub-goal of a dream), the associated dream is selected (e.g., highlighted by the goal-setter) in step 1104. Following step 1104 or if inquiry step 1102 determines that the goal is not to be affiliated with a dream, step 1106 opens a goal creation form generated by goal management system 190 (see FIG. 1). If inquiry step 1108 determines that the goal is affiliated with a dream, the dream's identifier and title are placed in the goal creation form in step 1110. For example, the Goal Manager automatically places the dream identifier and dream title in the form to correspond to the dream selected in step 1104. Following step 1110, or if the goal is not affiliated with a dream in step 1168, the goal sequence number is entered in step 1112. In step 1114, the goal title is entered in the goal creation form. Any audio/visual representations of the inspiration(s) for the goal being created are pasted or attached in step 1116. These representations can be attached in any of known electronic file formats, such as jpeg, mpeg, wav, etc. In step 1118, the target date for achieving the goal is entered. The category and type of the goal are entered in steps 1120 and 1122, respectively.

Figure 11A:
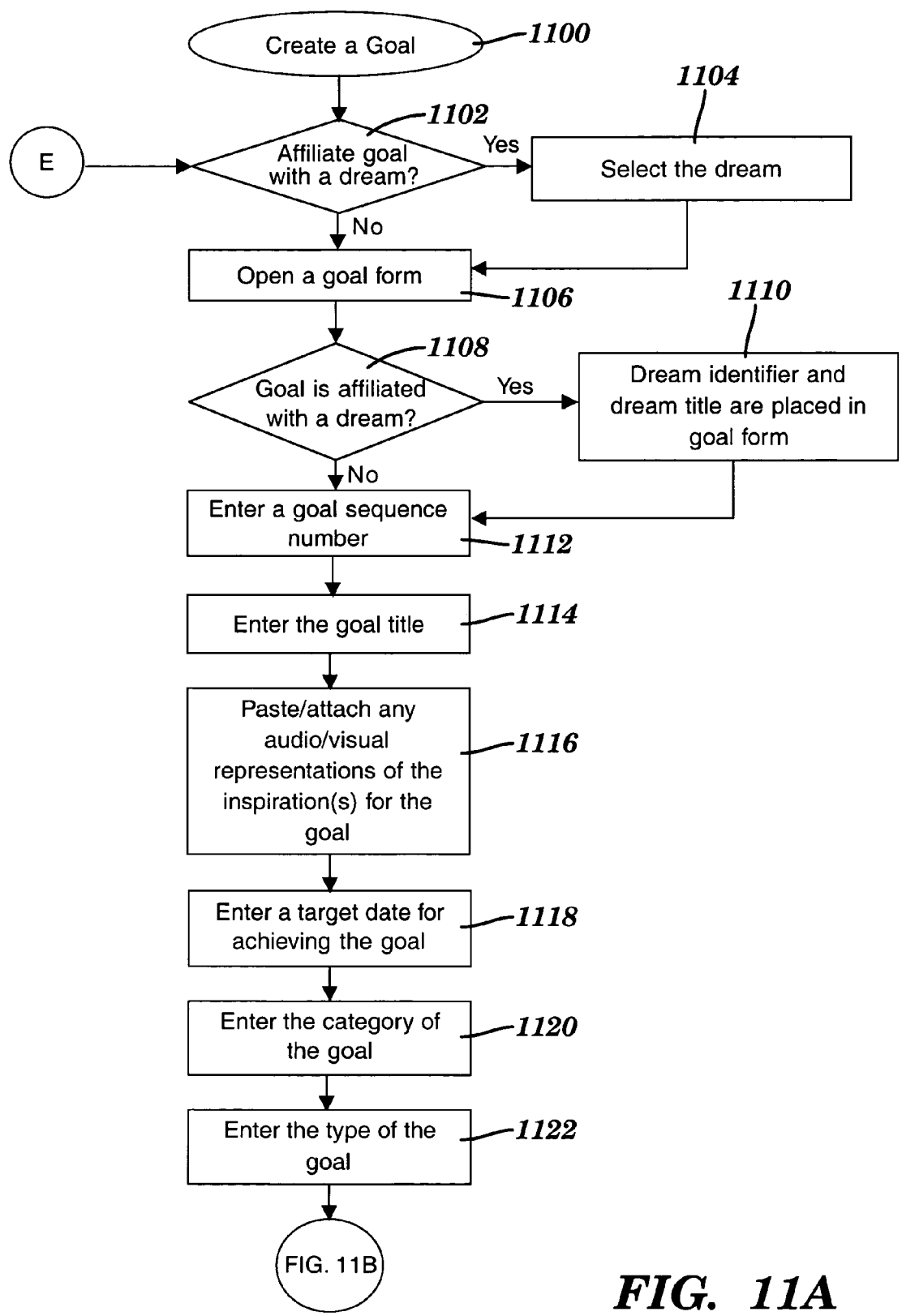
FIGS. 11A-11D depict a flow chart showing a method of creating an independent goal or a sub-goal for the goal management method in FIG. 3, in accordance with embodiments of the present invention.
Figure 11B:
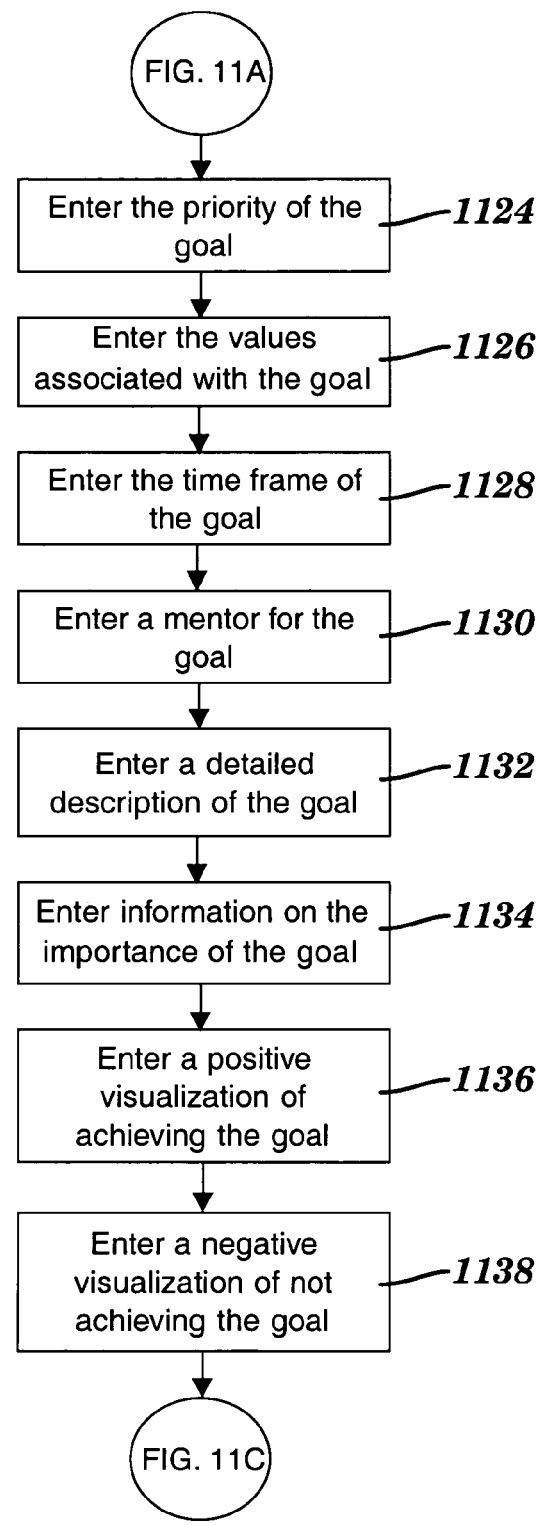

The goal creation method continues in FIG. 11B at step 1124, in which the priority level of the goal is entered. The goal-setter's values associated with the goal are entered in step 1126. In step 1128, the time frame during which the goal is to be achieved is entered. In step 1130, the goal-setter has the option to associate at least one mentor with the goal. The mentor is a third party who can provide the goal-setter with, for example, knowledge, advice, guidance and motivation relative to the achievement of the goal. In step 1132, a detailed description of the goal is entered. Information relative to the importance of the goal is entered in step 1134. A positive visualization of achieving the goal and a negative visualization of not achieving the goal are entered in steps 1136 and 1138, respectively.

Figure 11C:
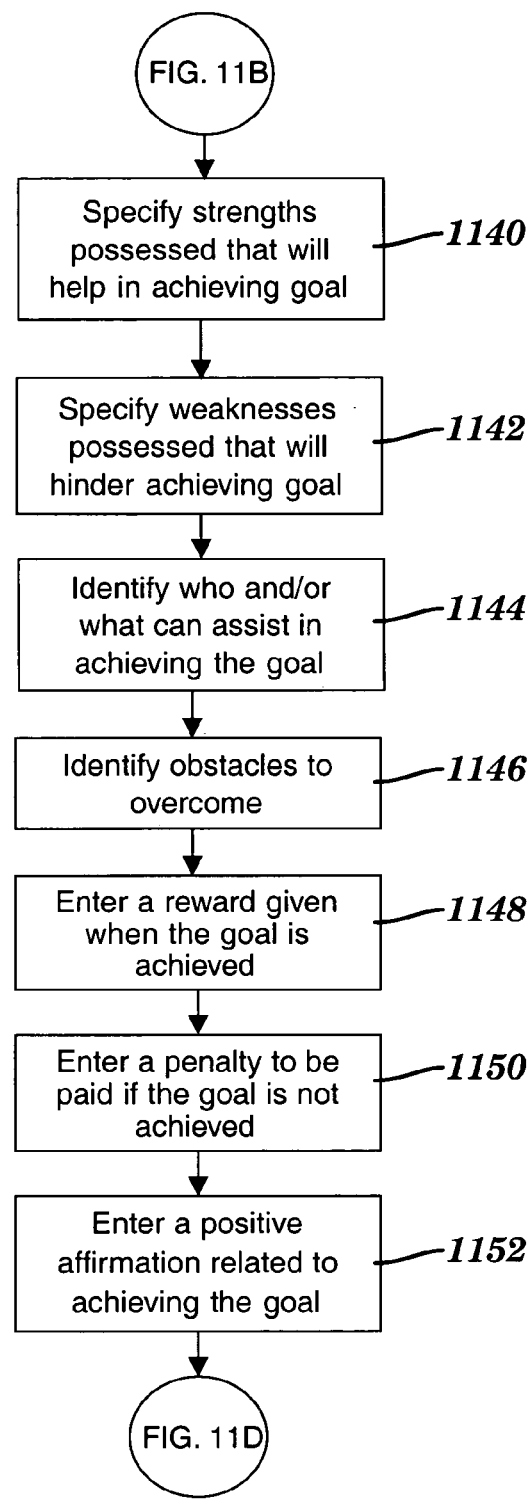

The goal creation method continues in FIG. 11C at steps 1140 and 1142, in which strengths and weaknesses, respectively, are entered. Strengths are characteristics possessed by the goal-setter that assist in the achieving of the goal. Weaknesses are characteristics of the goal-setter that will hinder the achievement of the goal. In step 1144, whoever and/or whatever can assist in the achievement of the goal are identified. In step 1146, obstacles to overcome in order to achieve the goal are entered. A reward to be received by the goal-setter upon achieving the goal is entered in step 1148. A penalty to be paid if the goal is not achieved is entered in step 1150. A positive affirmation related to achieving the goal is entered in step 1152.

Figure 11D:
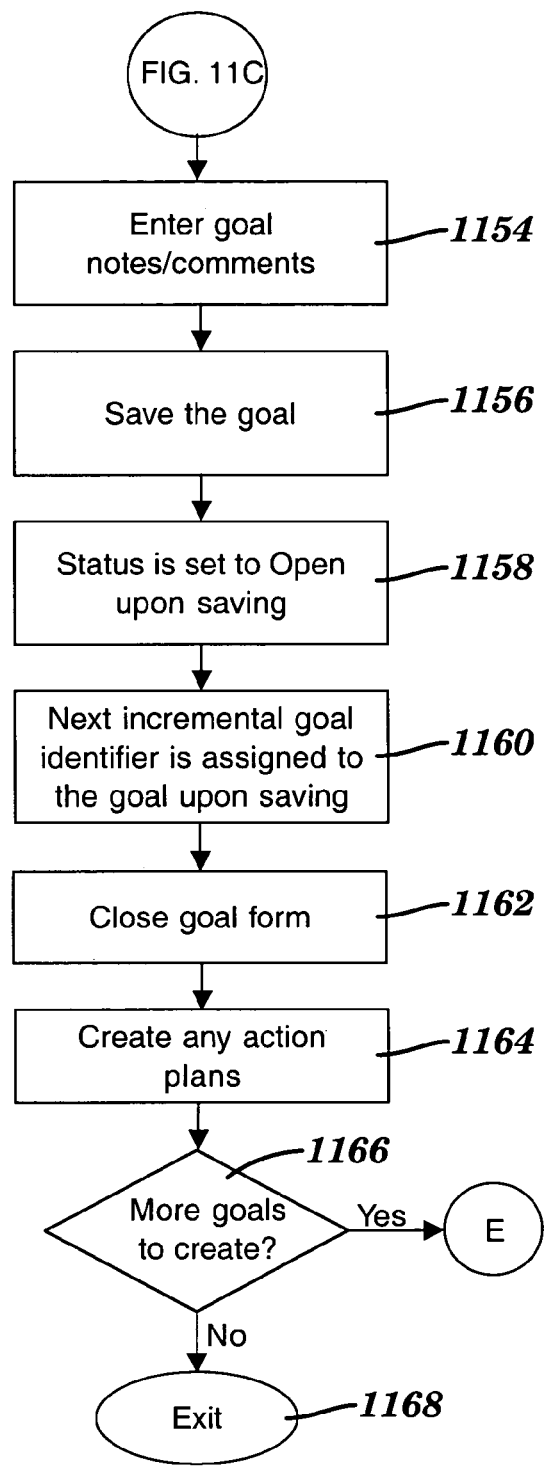

The goal creation method continues in FIG. 11D at step 1154, in which notes or comments relative to the goal are entered on the goal creation form. In step 1156, the goal being created is saved by the goal management system. Upon saving the goal, the status of the goal is set to Open and the next incremental goal identifier is assigned in steps 1158 and 1160, respectively. In step 1162, the goal creation form is closed. If more goals are to be created as determined by step 1166, the process described above is repeated starting at step 1102. If inquiry step 1166 finds that no other goals need to be created, the goal creation method ends at step 1168.

Figure 11E:
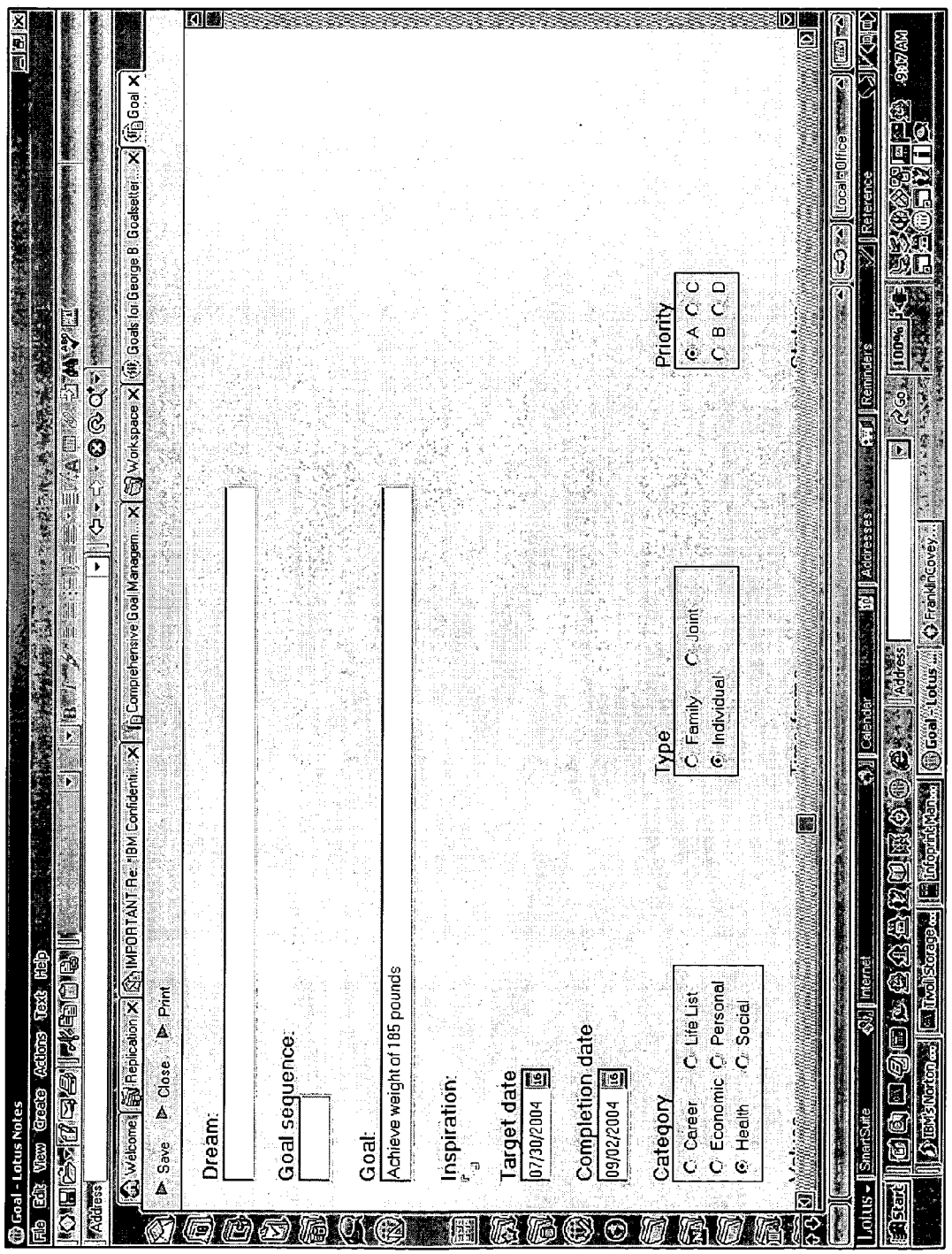
FIGS. 11E-11F are screen captures of an example of a goal creation form to be employed by the method of creating an independent goal or a sub-goal in FIGS. 11A-11D, in accordance with embodiments of the present invention.
Figure 11F:
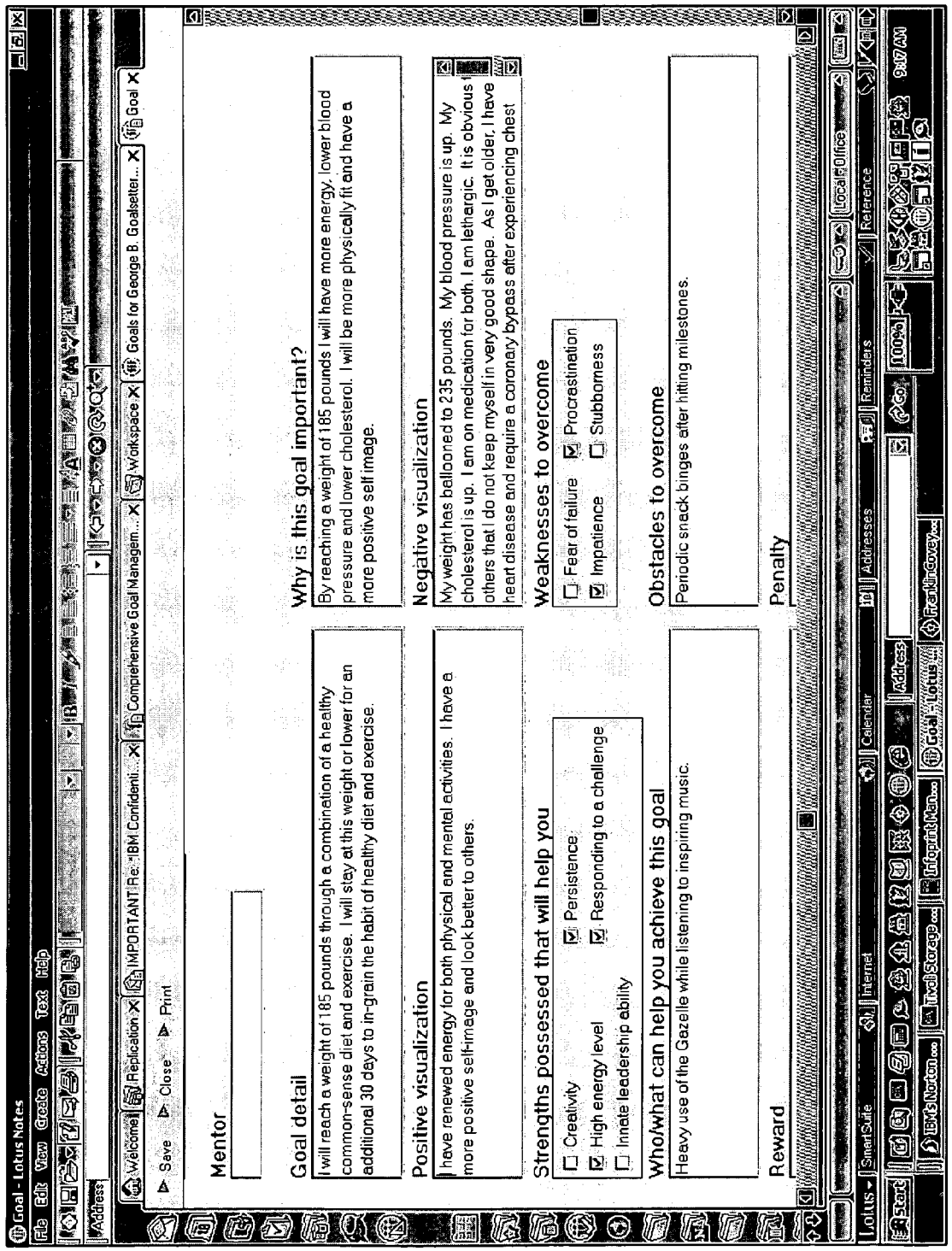

FIGS. 11E-11F are screen captures of an example of a goal creation form to be employed by the method of creating an independent goal or sub-goal in FIGS. 11A-11D, in accordance with embodiments of the present invention. The sample goal creation form in FIGS. 11E-11F includes fields, check boxes, and radio buttons for entering or selecting the following items for the goal being created: a sequence number (step 1112), title (step 1114), target date (step 1118), category (step 1120), type (step 1122), priority level (step 1124), associated value(s) (not shown; step 1126), time frame (not shown; step 1128), associated mentor (step 1130), a detailed description of the goal (step 1132), an explanation of why the goal is important to the goal-setter (step 1134), a positive visualization of achieving the dream (step 1136), a negative visualization of not achieving the goal (step 1138), strengths of the goal-setter that will help in achieving the goal (step 1140), weaknesses of the goal-setter that will hinder the achievement of the goal (step 1142), a description of who and/or what can help the goal-setter achieve the goal (step 1144), obstacles to overcome (step 1146), a reward provided when the goal is achieved (step 1148), a penalty paid when the goal is not achieved (step 1150), and notes and comments relative to the goal (not shown; step 1154). The dream title field on FIG. 11E is filled in automatically (step 1110) if the goal is associated with a dream. The screen location labeled Inspiration on FIG. 11E allows the pasting or attaching of an audio/visual representation of a source of inspiration related to the goal (step 1116). Upon activating the Save screen button on FIG. 11E, the Status area (not shown) is set to Open (step 1158). After the goal is achieved, the completion date field on FIG. 11E can be filled in with the date the goal was achieved.

Figure 11G:
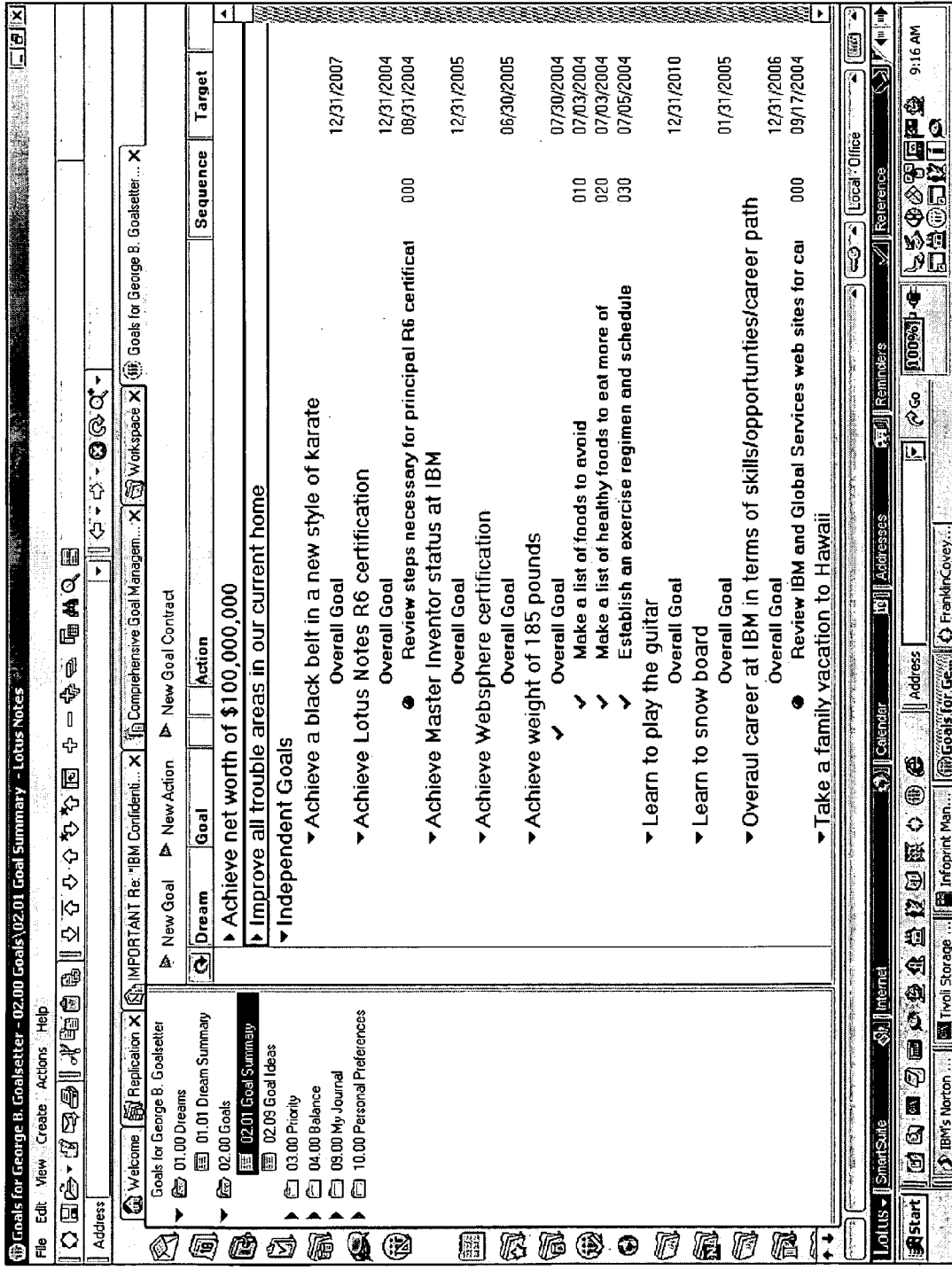
FIG. 11G is a screen capture of an example of a summary of goals created by the method of creating an independent goal or a sub-goal in FIGS. 11A-11D, in accordance with embodiments of the present invention.

FIG. 11G is a screen capture of an example of a summary of goals created by the method of creating an independent goal or a sub-goal in FIGS. 11A-11D, in accordance with embodiments of the present invention. The goal summary in FIG. 11G includes, for example, a list of the titles of the goals created, actions for achieving a goal listed below their associated goal, sequence numbers for each action, target dates for each goal created, and target dates for each action.

Creating Actions

Figure 12A:
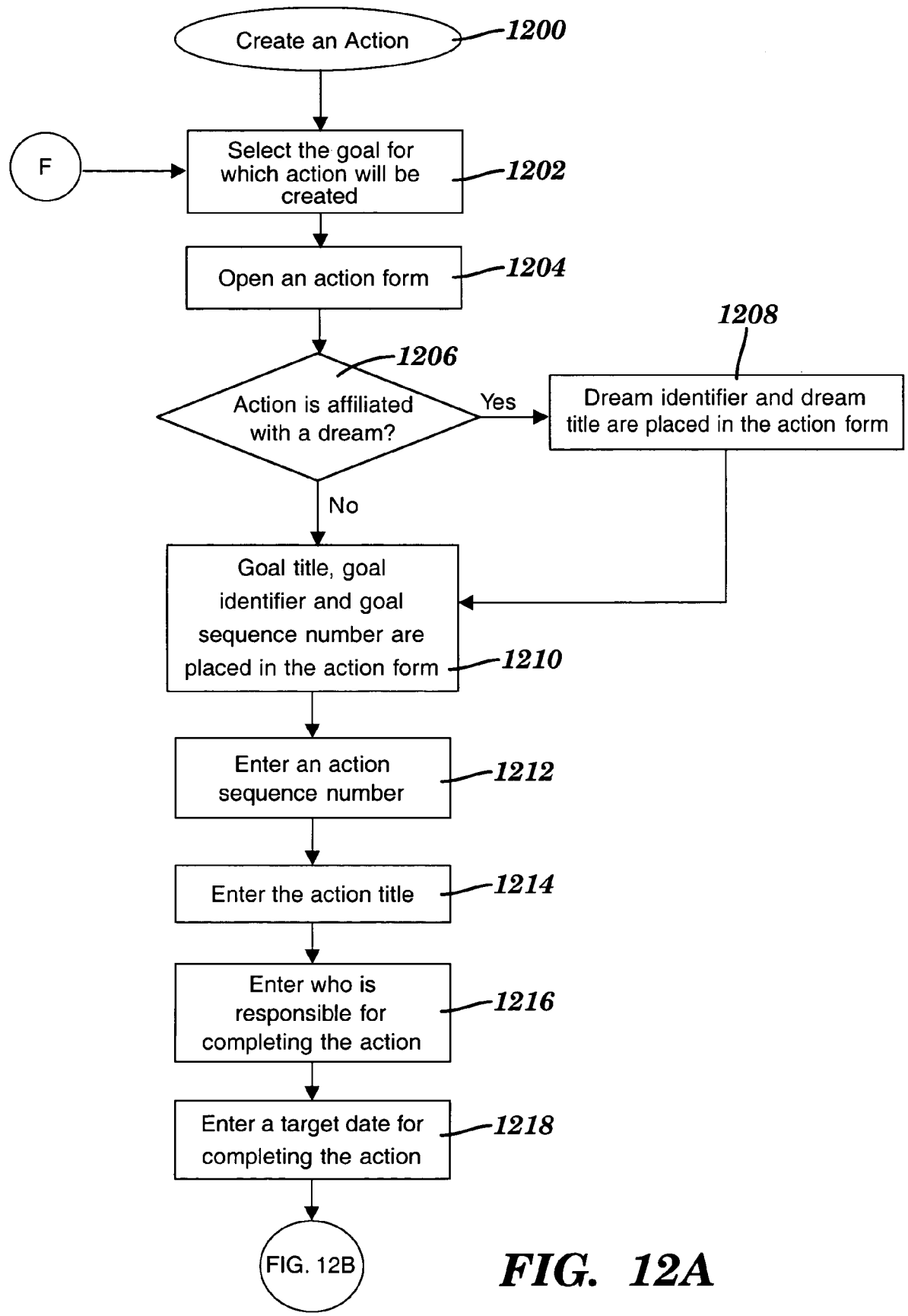
FIGS. 12A-12B depict a flow chart showing a method of creating an action for the goal management method in FIG. 3, in accordance with embodiments of the present invention.
Figure 12B:
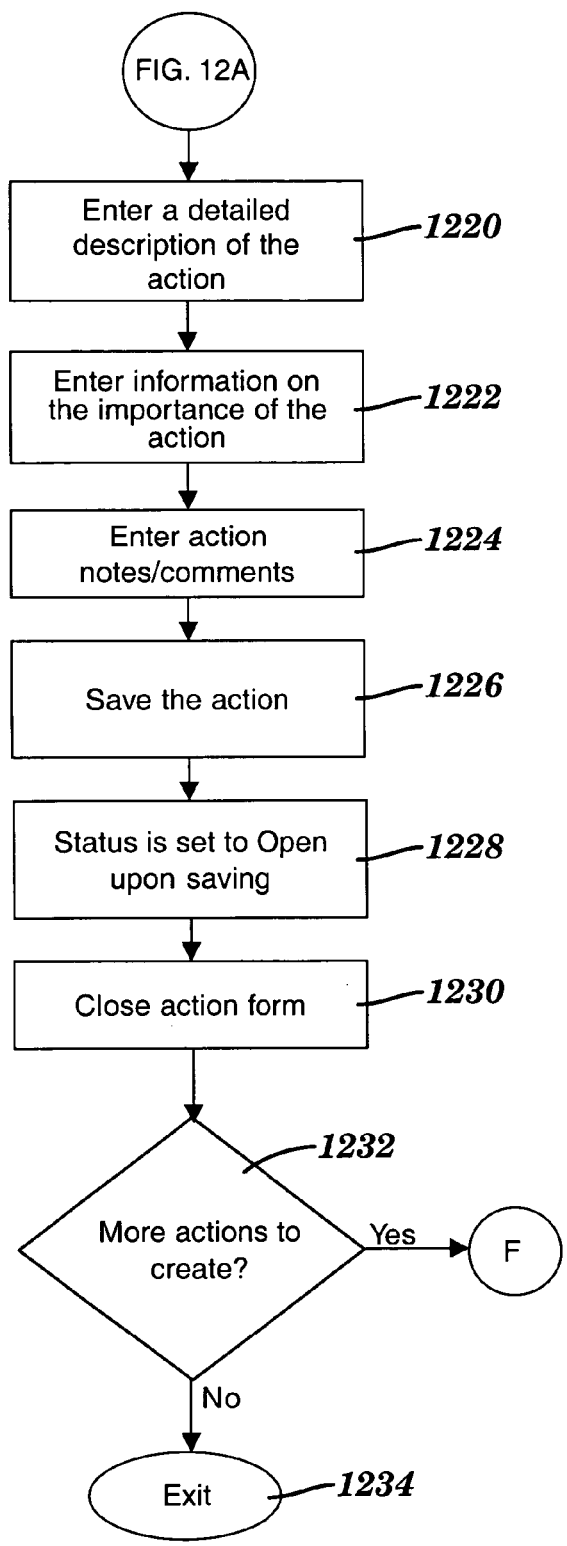

FIGS. 12A-12B depict a flow chart showing a method of creating an action for the goal management method in FIG. 3, in accordance with embodiments of the present invention. The action creation method begins at step 1200. In step 1202, the goal for which the action is to be created is selected by, for example, the goal-setter. The action creation form is opened in step 1204. If inquiry step 1206 determines that an action is associated with a dream, then the dream identifier and dream title are automatically placed in the action creation form by the Goal Manager. Following step 1208, or if inquiry step 1206 determines that the action to be created is not associated with a dream, the goal title, goal identifier, and goal sequence number are automatically placed in the action creation form by the Goal Manager in step 1210. In steps 1212, 1214, 1216 and 1218, the goal-setter enters an action sequence number, the title of the action, who is responsible for completing the action, and a target date for completing the action.

The action creation method continues in FIG. 12B in step 1220, in which a detailed description of the action is entered. In steps 1222 and 1224, information regarding the importance of the action and any notes or comments relative to the action are entered. In step 1226, the action is saved in goal management system 190 (see FIG. 1). Upon saving the action, the status is set to Open in step 1228. The action creation form is closed in step 1230. If inquiry step 1232 determines that more actions are to be created, the process described above is repeated starting at step 1202. If step 1232 determines that no other actions need to be created, then the action creation method ends at step 1234.

Figure 12C:
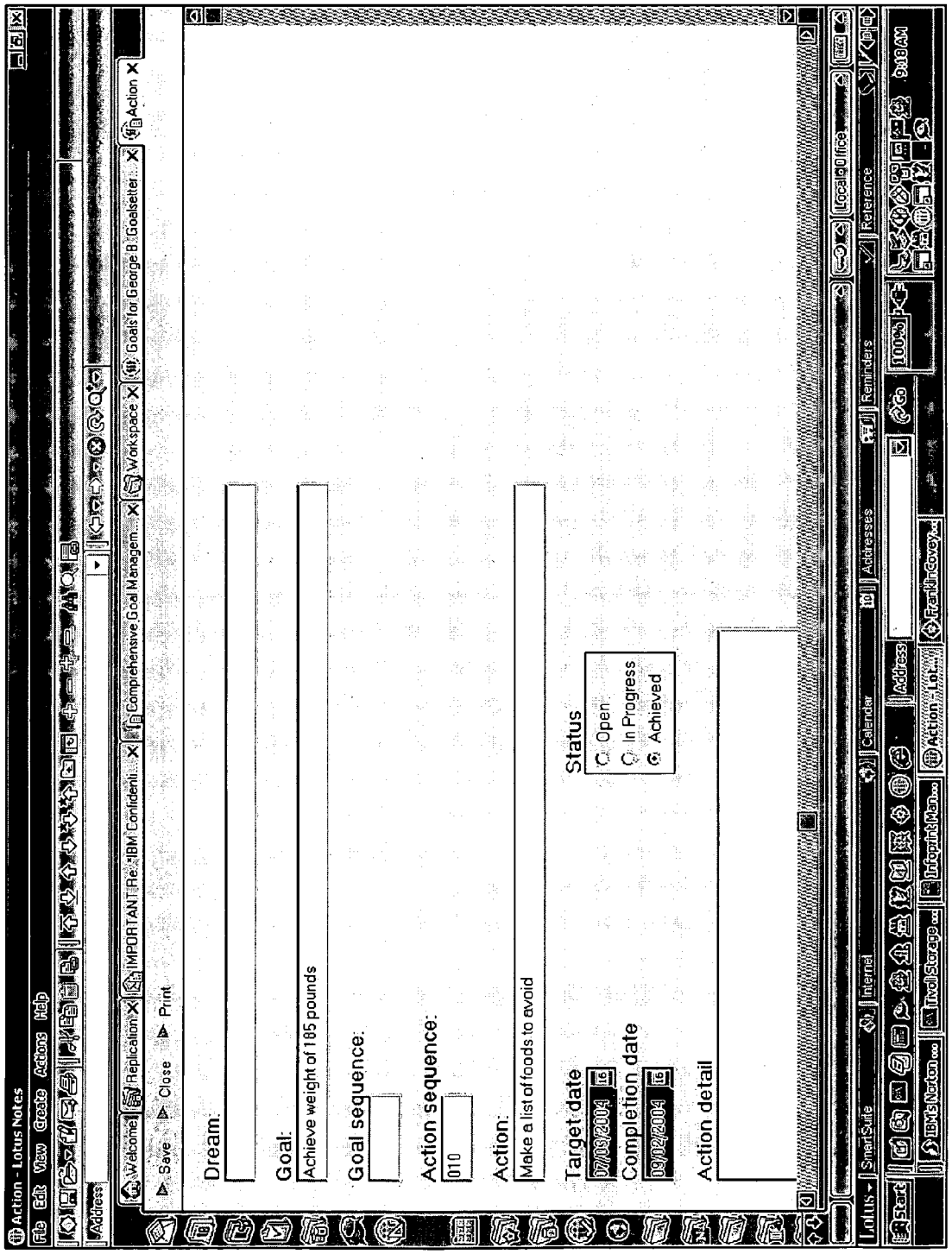
FIG. 12C is a screen capture of an example of an action creation form to be employed by the method of creating an action in FIGS. 12A-12B, in accordance with embodiments of the present invention.

FIG. 12C is a screen capture of an example of an action creation form to be employed by the method of creating an action in FIGS. 112A-12B, in accordance with embodiments of the present invention. The sample goal creation form in FIG. 12C includes fields and radio buttons for entering or selecting the following items for the action being created: an action sequence number (step 1212), action title (step 1214), target date (step 1218), and a detailed description of the action. Although not shown, an action creation form can also include a field for entering who is responsible for completing the action (step 1216), information related to the importance of the action (step 1222) and notes and comments related to the action (step 1224). The dream title field on FIG. 12C is filled in automatically (step 1208) with an associated dream if the action is associated with a dream. The goal title field is filled in automatically (step 1210) with the goal associated with the action. Upon activating the Save screen button on FIG. 12C, the Status area is set to Open (step 1228). After the goal is achieved, the completion date field on FIG. 12C is filled in and the Status area is set to Achieved.

Achieving Balance

Figure 13:
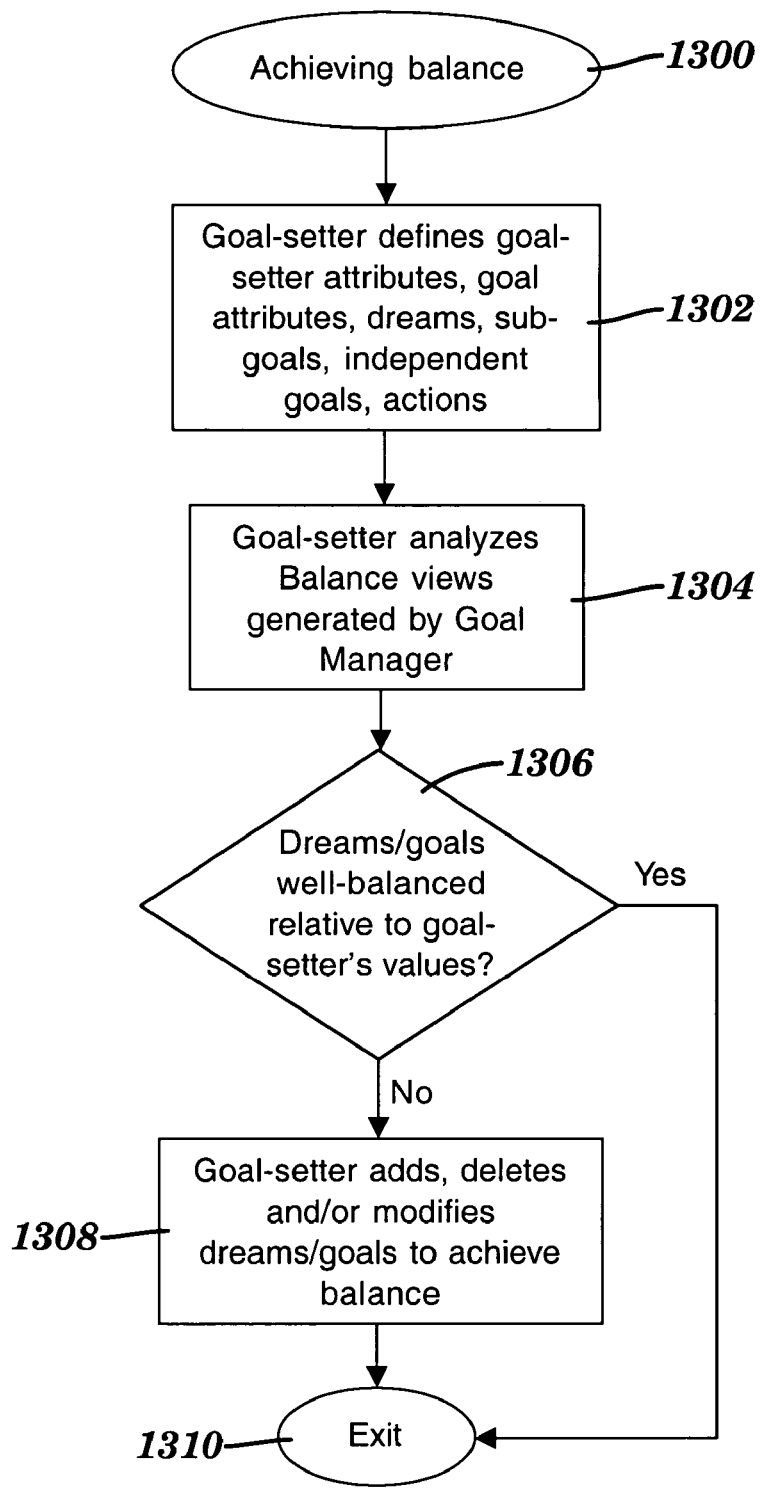
FIG. 13 is a flow chart showing a method of achieving balance in the goal management method in FIG. 3, in accordance with embodiments of the present invention.

FIG. 13 is a flow chart showing a method of achieving balance in the goal management method in FIG. 3, in accordance with embodiments of the present invention. The achieving balance method begins in step 1300. In step 1302, the goal-setter defines goal attributes, goal-setter attributes, as well as specific dreams, sub-goals, independent goals and actions. In step 1304, the goal-setter analyzes Balance views which are generated by the Goal Manager. Balance views can include, for instance, views displaying goals and their counts grouped by goal-setter attributes, goal-setter attributes and their counts grouped by other goal-setter attributes, and goal-setter attributes together with frequencies associated therewith. More specifically, exemplary Balance views include listings of dream counts grouped by category or by values; goal counts grouped by category or by values; sources of inspiration counts grouped by type or by values; and strengths and weaknesses frequencies. The views discussed above are merely examples. Goal management system 190 (see FIG. 1) can provide views displaying goals or actions grouped by any goal attribute or grouped by any goal-setter attribute.

A goal-setter can view dream and/or goal counts grouped by values and determine if the goals being pursued appropriately reflect the values espoused by the goal-setter. That is, the goal-setter can determine if there is some aspect of balance in the goal-setter's life by determining if goals are distributed among values in an optimal manner. The optimal distribution is defined by the goal-setter. In one example, this balance can be achieved when the number or count of goals associated with each value is proportionate to the ranking level of each value. As used herein in one embodiment, "the number or count of goals associated with each value is proportionate to the ranking level of each value" does not necessarily mean that a strict mathematical definition of "proportion" applies; instead it means that when comparing two values, the value with the higher ranking level is associated with the greater number of goals. In another embodiment, the aforementioned phrase means that a value with a higher ranking level should be associated with at least the same number of goals as a value having a lower ranking level. Another aspect of balance may include ensuring that all values are represented to a degree specified by the goal-setter (e.g., each value has at least one goal associated with it, or each value has a threshold number of goals that should be associated with it).

If in inquiry step 1306, the goal-setter determines from the Balance views that the defined goals are not well-balanced relative to the goal-setter's values, the goal-setter manages the goals to achieve balance. This management of goals includes, for example, adding, deleting, and/or modifying goals to achieve balance in step 1308. After achieving balance in step 1308, the balance achieving method ends in step 1310. Returning to inquiry step 1306, if balance is determined, the balance achieving method ends in step 1310.

Figure 14A:
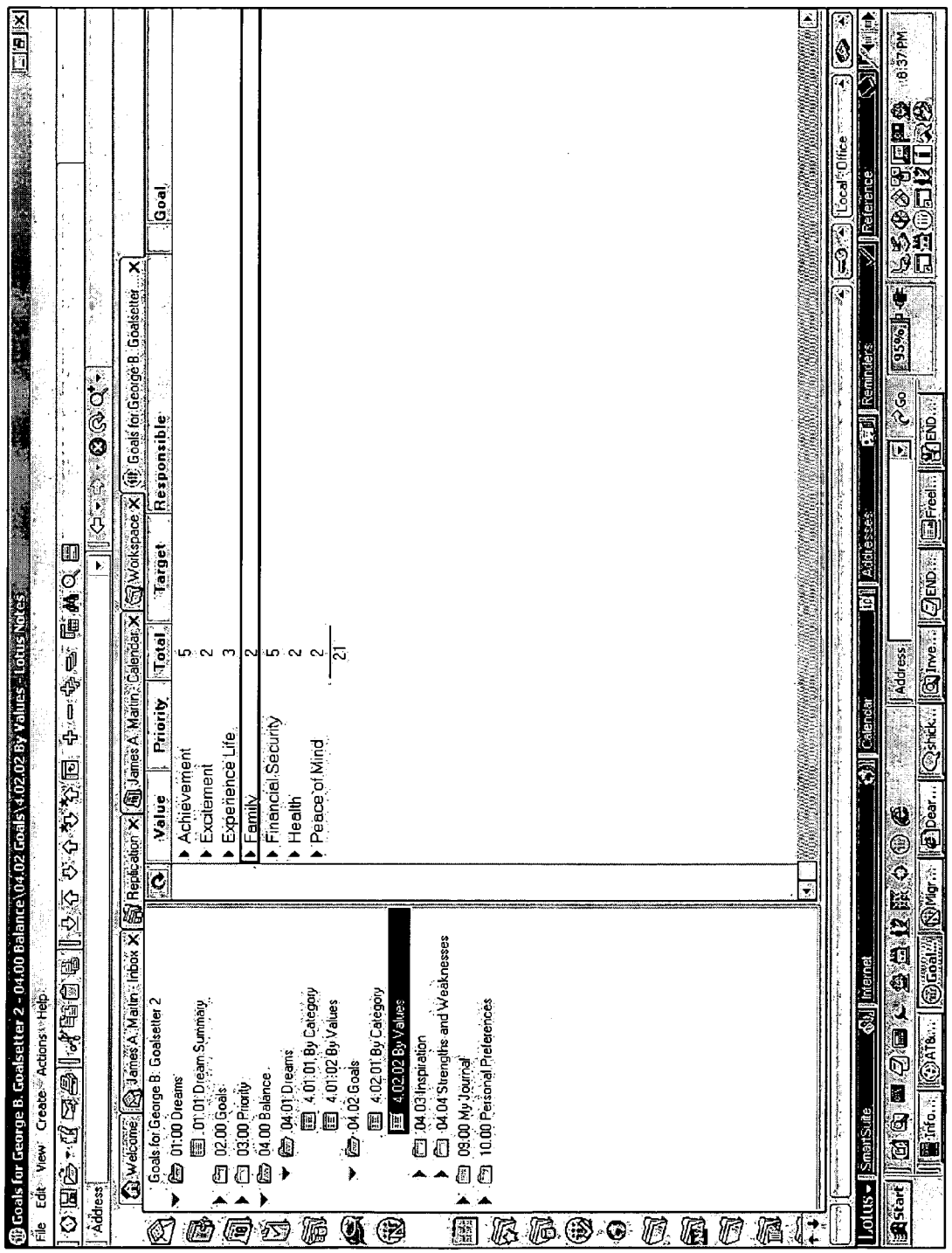
FIGS. 14A-14F are screen captures showing Balance views that can be employed in the method of achieving balance in FIG. 13; in accordance with embodiments of the present invention.
Figure 14B:
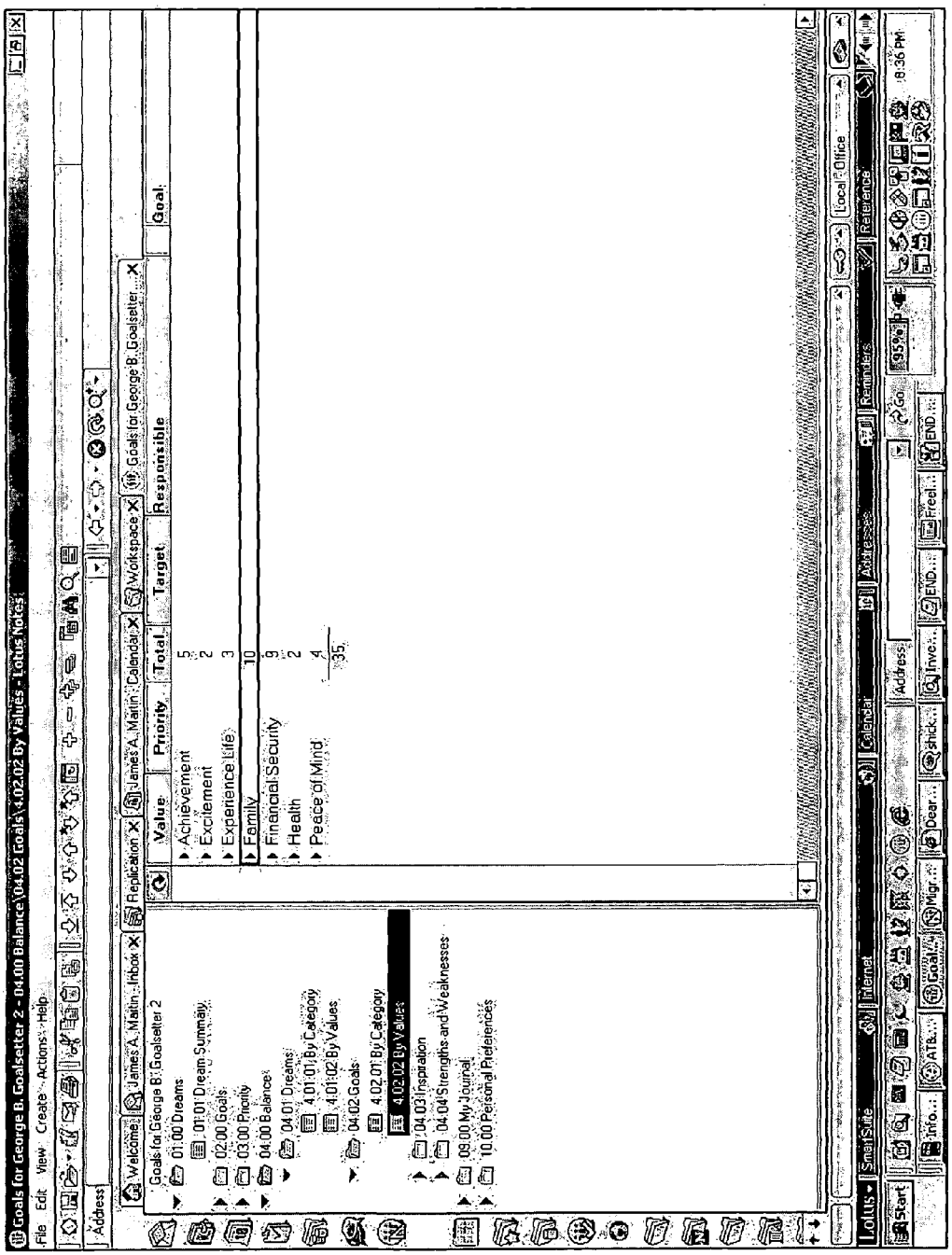

FIGS. 14A-14F are screen captures showing Balance views that can be employed in the method of achieving balance in FIG. 13, in accordance with embodiments of the present invention. In one example of achieving balance, the value of "Family" is ranked higher than (i.e., is more important to the goal-setter) than the value of "Financial security." In this example, FIG. 14A shows values and the total number of goals associated with each value before balance is achieved. In FIG. 14A, two goals are associated the "Family" value, and five goals are associated with the "Financial security" value. The goal-setter's analysis of the total number of goals associated with the "Family" and "Financial security" values in step 1304 in FIG. 13 identifies a lack of balance (i.e., an imbalance) in step 1306 that needs to be addressed. One way for the goal-setter to address this imbalance is to add more goals (in step 1308) associated with the "Family" value so that the number of goals so associated will exceed the number of goals associated with the "Financial security" value. After such an addition of goals, the Balance view can change to the one shown in FIG. 14B, in which 10 goals are associated with the "Family" value and 9 goals are associated with the "Financial security" value. Thus, in this example, FIG. 14B is a Balance view that shows values and the number of goals associated with each value after balance is achieved.

The imbalance shown in the FIG. 14A example can be addressed in other ways. For instance, goals associated with the "Financial security" value can be deleted until the number of goals so associated is below the number of goals associated with the "Family" value. Another way to address the imbalance is to reassign previously assigned values after determining that more of the already defined goals should be associated with "Family" and/or that fewer of the already defined goals should be associated with "Financial security." Balance can also be achieved by some combination of the aforementioned adding of goals, deleting of goals, and modifying of value assignments described above.

Since balance is defined by the goal-setter, other methods of achieving balance using values can be contemplated. For example, using the relative rankings described above for the "Family" and "Financial security" values, the goal-setter can define balance as having at least the same number of goals associated with each of these two values. As another example, the goal-setter can set threshold numbers of goals for each value, and consider balance as having at least the corresponding threshold number of goals associated with each value. Again, some combination of the above methods can also be employed to achieve balance. For instance, the goal-setter can define balance as each value having at least a corresponding predetermined threshold number of goals associated with it, while the number of goals associated with each value is also proportionate to the ranking levels-of the values. The goal-setter can define balance in still other ways, such as having one of the proportionate relationships described above also exist within one or more categories of goals.

Figure 14C:
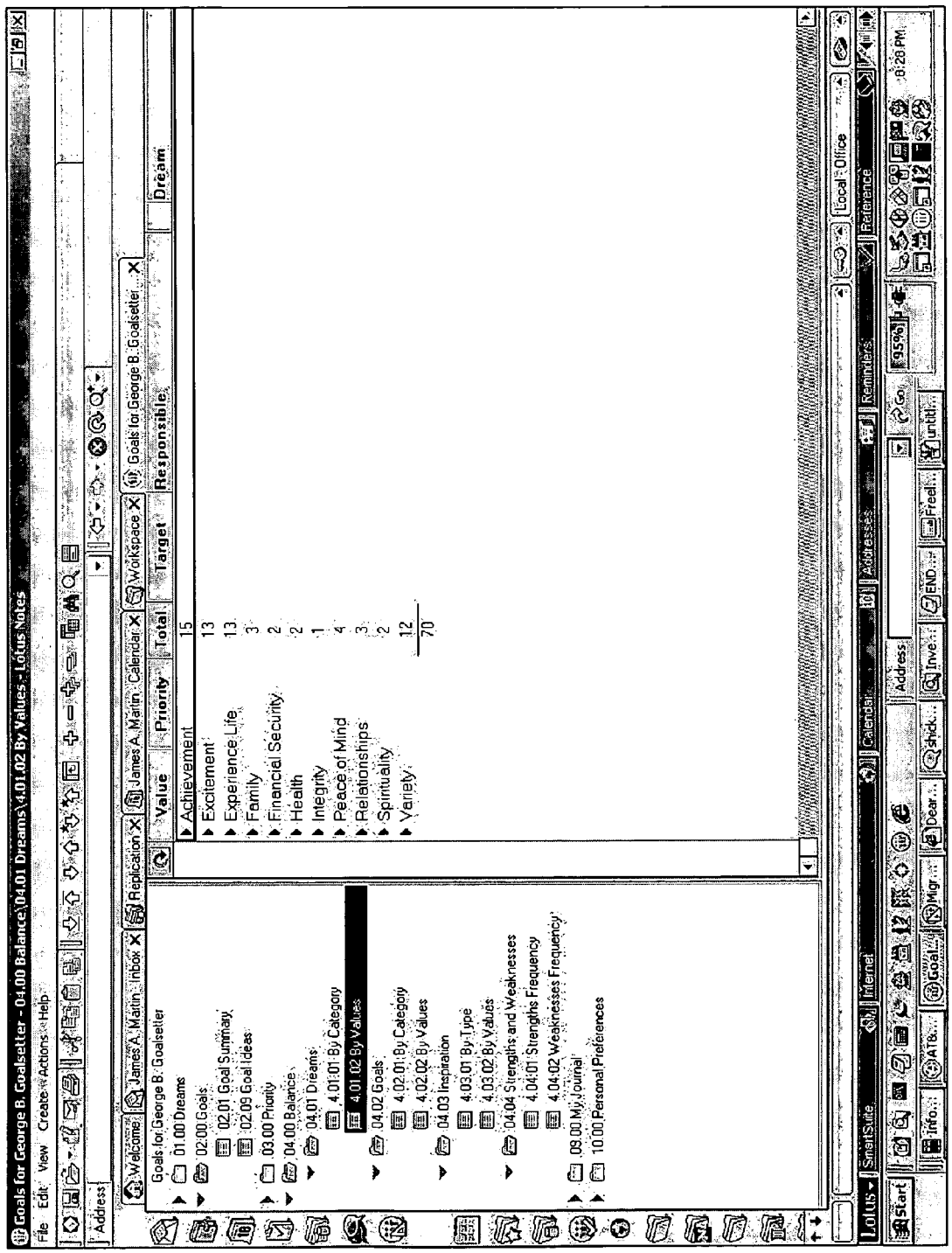
Figure 14D:
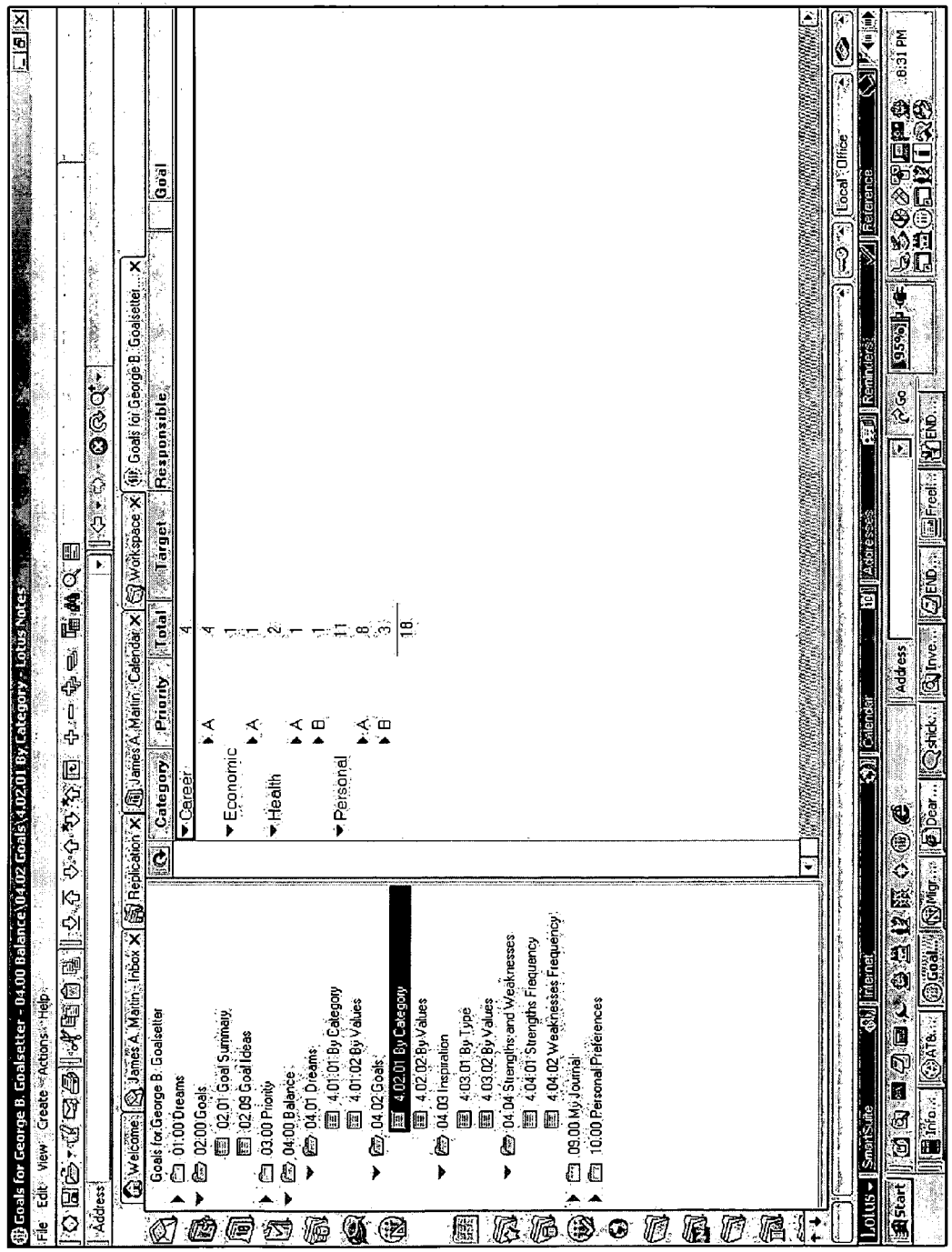
Figure 14E:
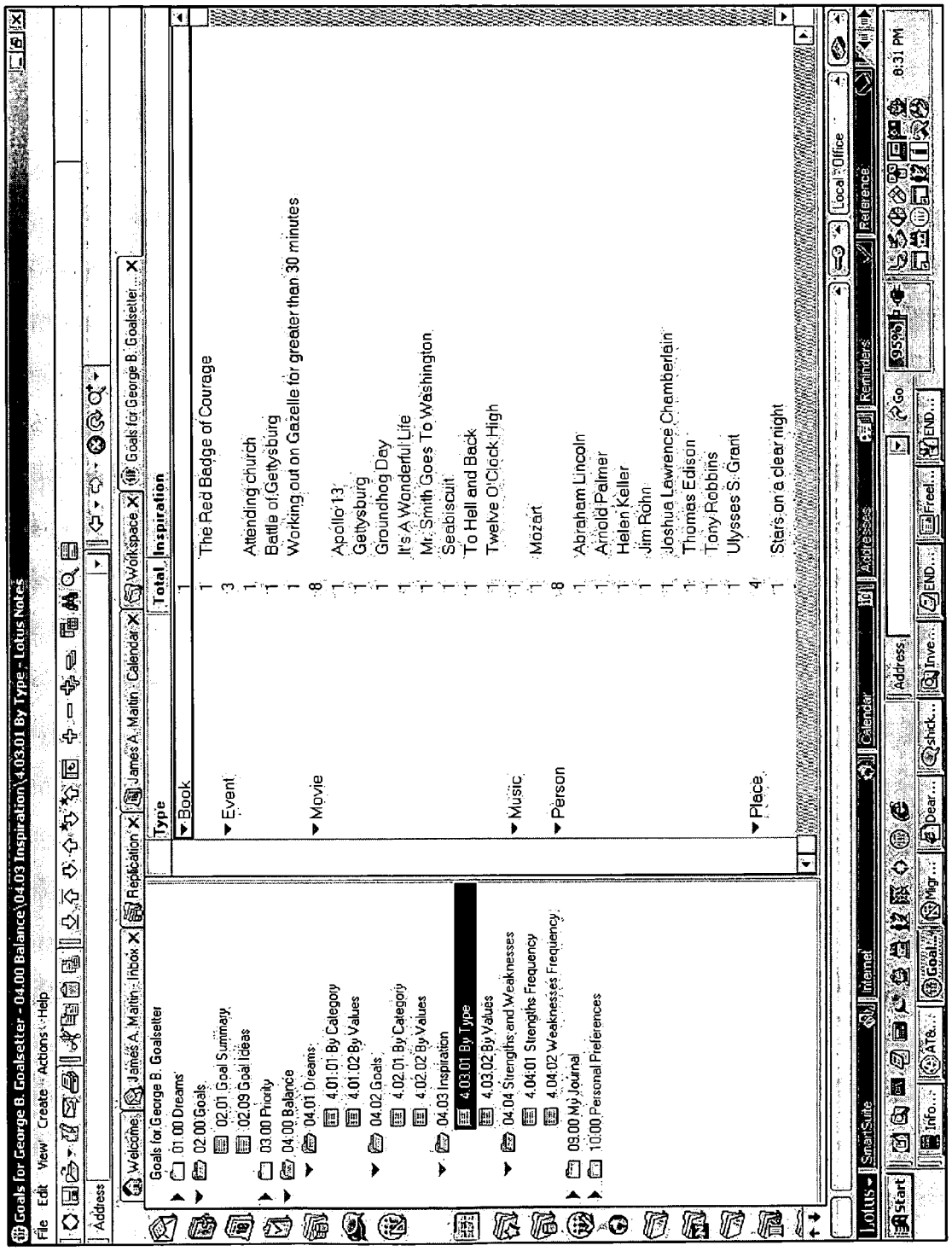
Figure 14F:
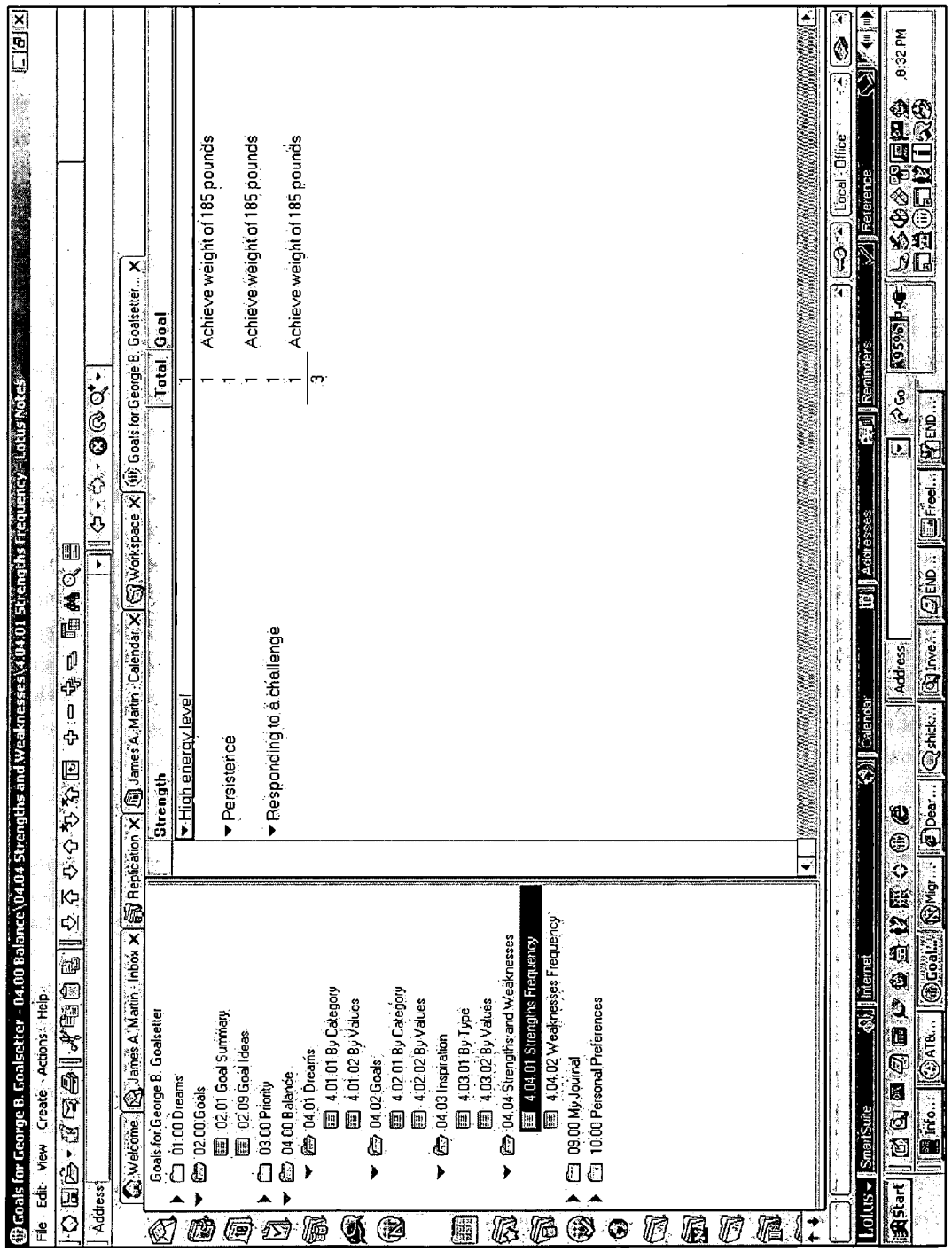

FIGS. 14C-14F depict other Balance views that can be used to achieve balance according to the method of FIG. 13. FIG. 14C is a Dreams by Values view that includes value names and the number of dreams associated with each value. FIG. 14D is a Goals by Category view that lists each goal category and the total number of goals associated with each category. The number of goals is also subdivided into numbers of goals associated with each priority level. FIG. 14E is a Inspiration by Type view that includes the names of the sources of inspiration defined by the goal-setter, grouped by the type of inspiration. The total number of inspiration sources for each type is also included. FIG. 14F is a Strengths Frequency view that includes each strength name along with a list of goals whose achievement can be assisted by the strength, the total number of goals associated with all the strengths listed, and sub-totals of the number of goals associated with each strength.

Dream and Goal Identifiers

Figure 15:
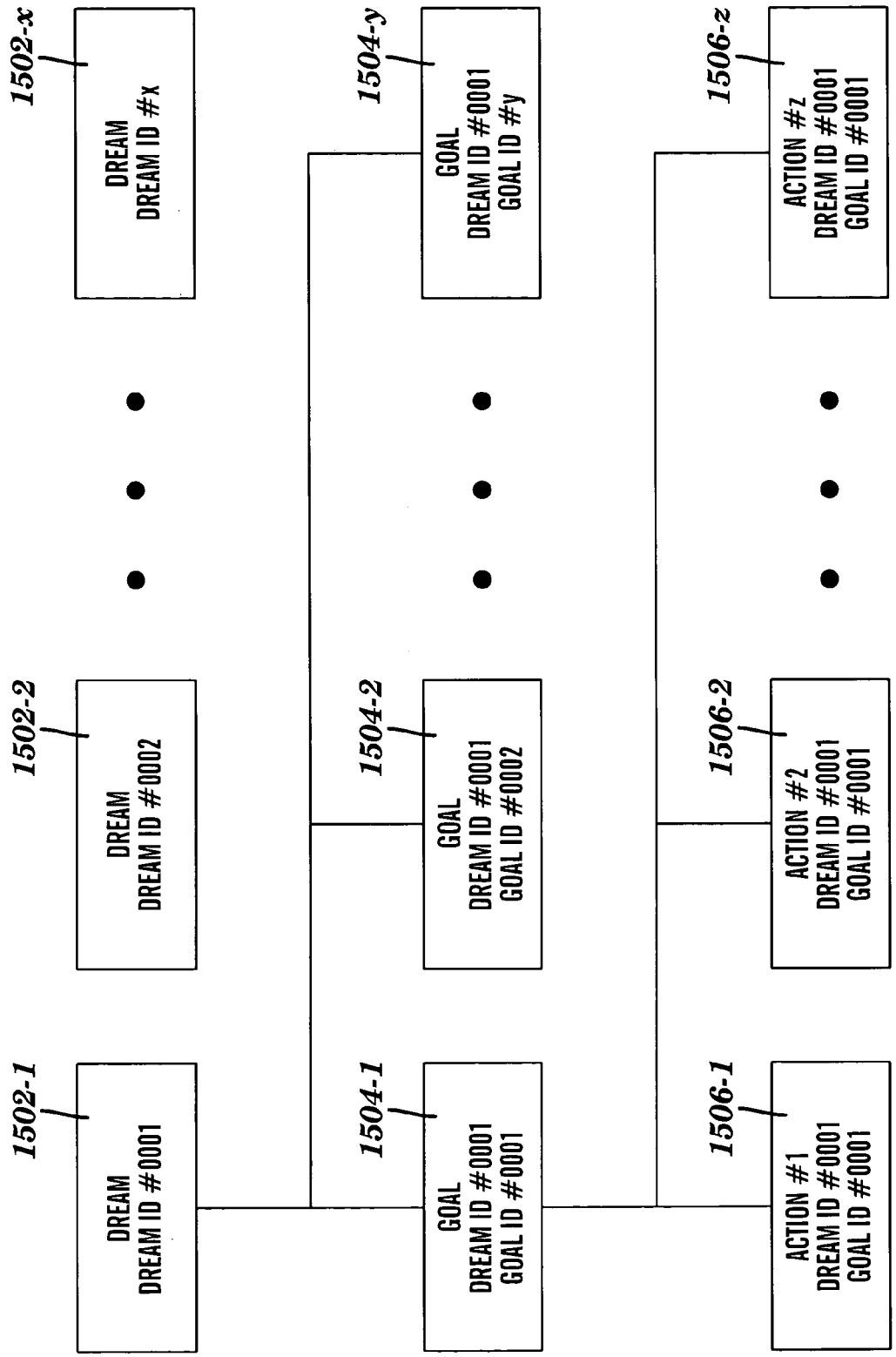
FIG. 15 is a block diagram showing hierarchical relationships among dreams, sub-goals and actions, as generated in the goal management method in FIG. 3, in accordance with embodiments of the present invention.

FIG. 15 is a block diagram showing hierarchical relationships among dreams, sub-goals and actions, as generated in the goal management method in FIG. 3, in accordance with embodiments of the present invention. Hierarchy 1500 includes a set of dreams 1502-1 and **1502-2-1502-*x*; a set of sub-goals 1504-1 and 1504-2 -1504-*y*; and a set of actions 1506-1 and 1506-2-1506-*z*. In FIG. 15, the sub-goals 1504 are associated with dream 1502-1 (i.e., dream 1502-1 is at the top of the hierarchy and sub-goals 1504 are on the next hierarchical level below the dream). These associations are determined by dream 1502-1 and each of the multiple sub-goals 1504 including a dream identifier (#0001) that uniquely identifies dream 1502-1. Actions are included in a hierarchical level below the level of sub-goals. In FIG. 15, actions 1506 are associated with sub-goal 1504-1 by means of a sub-goal identifier (#0001) included in each action that uniquely identifies sub-goal 1504-1. Moreover, each of actions 1506 is also associated with dream 1502-1 by inheriting the same dream identifier (#0001) that is included in the associated sub-goal 1504-1**. These dream and sub-goal identifiers allow, for example, modifications made to a dream to be accessible when viewing the details of an action that is associated with a sub-goal of the modified dream.

Another hierarchical relationship (not shown) exists among independent goals and their associated actions. In this case, each independent goal is uniquely identified by a goal identifier. The goal identifier is also associated with each action that is associated with the goal. For example, if Goal X is identified by goal identifier #0005 and associated with Actions 1-10, then each of Actions 1-10 is associated with goal identifier #0005.

Additional Functionality

In addition to the functions described above, other goal management functions that can be provided by goal management system 190 (see FIG. 1) include displaying a screen show using one or more multimedia files associated with goal-setter attributes. For example, the screen show can include an mpeg file associated with a source of inspiration. Such a screen show can be viewed to provide a goal-setter with motivation to achieve a goal. Another goal management function provided by the goal management system includes providing an electronic journal that can be generated and maintained by the goal-setter. The electronic journal can include, for example, information identifying progress made toward achieving a goal, as well as the actual achievement of the goal. Still another goal management function includes providing a goal idea document that can be generated and maintained by the goal-setter. The goal idea document can include, for example, one or more brainstorming ideas associated with an additional goal (e.g., a goal not yet defined in the goal management system).

The goal management functions described herein provide comprehensive features for goal management system 190 (see FIG. 1). These comprehensive functions can be provided via a user interface employed by a computing device such as personal computer 224 (see FIG. 2). Via this user interface, comprehensive goal management functions are integrated and allowed to interact by employing the above-described associations among goal management information. For example, the goal-setter can, through a single interface, set, delete, modify, and track goal management information, as well as analyze views of goal management information. These views can, for instance, exploit the aforementioned associations among goal management information. Again, the analysis of these views can, for example, assist the goal-setter in maintaining balance, as described above.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of managing a goal, said method comprising:

a computer system receiving a dream, a goal, and an action entered by a goal-setter via a single interface, wherein said goal-setter is an individual person, wherein said dream is a first achievement toward which effort is directed by said individual person, wherein said dream is classified in a category that represents an area of a life of said individual person, wherein said goal is a second achievement toward which effort is directed by said individual person, wherein said goal is subordinate to said dream in a hierarchy, wherein said goal is classified in said category that represents said area of said life of said individual person, wherein said action is a task to be performed by said individual person to achieve said goal;

said computer system assigning an identifier to said goal;

said computer system receiving goal-setter attributes entered by said individual person via said single interface, wherein said goal-setter attributes include values, strengths, weaknesses and inspirations of said individual person, wherein said values include principles espoused by said individual person and form bases of conduct of said individual person, wherein said strengths include first characteristics of said individual person that facilitate an attainment of said goal, wherein said weaknesses include second characteristics of said individual that hinder said attainment of said goal, wherein said inspirations include sources that motivate said individual person to attain said goal;

said computer system associating said goal-setter attributes with said goal based on said identifier assigned to said goal;

via said single interface, said computer system displaying views to said individual person, wherein said views indicate counts of goals in a set of goals grouped by said values, by said strengths and by said weaknesses, wherein said set of goals includes said goal and other goals entered by said individual person via said single interface, and wherein said views further indicate counts of said inspirations grouped by types of said inspirations;

subsequent to said displaying said views and in response to an entry on said single interface by said individual person, a processor of said computer system optimally distributing said goals in said set of goals among said values by deleting said goal or by adding a new goal to said set of goals to correct an imbalance based on a first number of goals exceeding a second number of goals, wherein said first number of goals counts a first subset of one or more goals including said goal in said set of goals associated with a first value of said values and said second number of goals counts a second subset of one or more goals in said set of goals associated with a second value of said values;

assigning a plurality of ranking levels to said values, wherein said ranking levels order said values to indicate a relative importance of each value to said individual person, wherein said optimally distributing said goals is based on said ranking levels, wherein said assigning said plurality of ranking levels includes assigning a first ranking level and a second ranking level of said plurality of ranking levels respectively to said first value and said second value, wherein said second ranking level exceeds said first ranking level to indicate that said second value is more important to said individual person than said first value, wherein said imbalance is indicated by said first number of goals exceeding said second number of goals and said second ranking exceeding said first ranking, wherein said optimally distributing includes updating said first number of goals by said deleting said goal or updating said second number of said goals by said adding said new goal associated with said second value, and wherein a result of said optimally distributing is said updated first number of goals does not exceed said second number of goals or said first number of goals does not exceed said updated second number of goals.

2. The method of claim 1, further comprising receiving a plurality of goal attributes associated with said set of goals, said plurality of goal attributes comprising attributes selected from the group consisting of classifications, priorities, time frames, and combinations thereof, wherein a classification of said classifications classifies said goal according to said category and/or a type, said category and said type being defined by said goal-setter, wherein a priority of said priorities indicates a relative urgency of achieving said goal, and wherein a time frame of said time frames indicates a period of time during which said goal is to be achieved.

3. The method of claim 2, further comprising displaying said set of goals grouped by said goal attributes.

4. The method of claim 1, further comprising:

associating said goal and with said action based on said identifier.

5. The method of claim 4, further comprising:

assigning a dream identifier to said dream;

associating said goal with said dream based on said dream identifier;

associating, via an inheritance of said dream identifier by said action, said action with said dream.

6. The method of claim 1, wherein said receiving said goal includes receiving a template based on another goal defined prior to said goal, a template originally generated by said goal-setter, or a template generated by an expert in a subject associated with said goal.

7. The method of claim 6, wherein said receiving said goal includes receiving said template generated by said expert in said subject associated with said goal.

8. The method of claim 1, further comprising:

exporting, to a software application, information associated with said goal and/or said action, wherein said software application is external to said computer system.

9. The method of claim 1, further comprising:

importing, from a software application, information to be associated with said goal and/or said action, wherein said software application is external to said computer system.

10. The method of claim 1, further comprising:

receiving a date, wherein said date is selected from the group consisting of a target date for achieving said goal, a due date for completing said action, and a combination thereof;

determining said date is impending or has passed; and responsive to said determining said date is impending or has passed, automatically sending a message to said goal-setter, wherein said message is associated with said goal and/or said action.

11. The method of claim 1, further comprising:
receiving a date, wherein said date is selected from the group consisting of a target date for achieving said goal, a due date for completing said action, and a combination thereof;
receiving an association of a mentor to said goal, wherein said mentor provides said goal-setter with knowledge, advice, guidance and motivation for achieving said goal; and
automatically sending a message to said mentor, wherein said message is associated with said goal and/or said action, and wherein said automatically sending said message is performed in response to a condition selected from the group consisting of said attainment of said goal, a completion of said action, said target date or said due date being impending, said target date or said due date having passed, said target date or said due date being modified, and combinations thereof.

12. The method of claim 1, wherein said receiving said goal-setter attributes includes receiving said inspirations as multimedia electronic files, and wherein said method further comprises:
displaying a screen show employing said multimedia electronic files to motivate said goal-setter to attain said goal.

13. The method of claim 1, further comprising providing an electronic journal generated and maintained by said goal-setter, wherein said electronic journal includes information indicating progress made toward attaining said goal and said attainment of said goal.

14. The method of claim 1, further comprising providing a goal idea document generated and maintained by said goal-setter, wherein said goal idea document includes one or more brainstorming ideas associated with an additional goal.

15. A computer system comprising a processor and a computer-readable memory unit coupled to said processor, said memory unit containing instructions executable by said processor for managing a goal, said system further comprising:
means for receiving a dream, a goal, and an action entered by a goal-setter via a single interface, wherein said goal-setter is an individual person, wherein said dream is a first achievement toward which effort is directed by said individual person, wherein said dream is classified in a category that represents an area of a life of said individual person, wherein said goal is a second achievement toward which effort is directed by said individual person, wherein said goal is subordinate to said dream in a hierarchy, wherein said goal is classified in said category that represents said area of said life of said individual person, wherein said action is a task to be performed by said individual person to achieve said goal;
means for assigning an identifier to said goal;
means for receiving goal-setter attributes entered by said individual person via said single interface, wherein said goal-setter attributes include values, strengths, weaknesses and inspirations of said individual person, wherein said values include principles espoused by said individual person and form bases of conduct of said individual person, wherein said strengths include first characteristics of said individual person that facilitate an attainment of said goal, wherein said weaknesses include second characteristics of said individual that hinder said attainment of said goal, wherein said inspirations include sources that motivate said individual person to attain said goal;
means for associating said goal-setter attributes with said goal based on said identifier assigned to said goal;
via said single interface, means for displaying views to said individual person, wherein said views indicate counts of goals in a set of goals grouped by said values, by said strengths and by said weaknesses, wherein said set of goals includes said goal and other goals entered by said individual person via said single interface, and wherein said views further indicate counts of said inspirations grouped by types of said inspirations;
subsequent to said displaying said views and in response to an entry on said single interface by said individual person, means for optimally distributing said goals in said set of goals among said values by deleting said goal or by adding a new goal to said set of goals to correct an imbalance based on a first number of goals exceeding a second number of goals, wherein said first number of goals counts a first subset of one or more goals including said goal in said set of goals associated with a first value of said values and said second number of goals counts a second subset of one or more goals in said set of goals associated with a second value of said values;
means for assigning a plurality of ranking levels to said values, wherein said ranking levels order said values to indicate a relative importance of each value to said individual person, wherein said optimally distributing said goals is based on said ranking levels, wherein said means for assigning said plurality of ranking levels includes means for assigning a first ranking level and a second ranking level of said plurality of ranking levels respectively to said first value and said second value, wherein said second ranking level exceeds said first ranking level to indicate that said second value is more important to said individual person than said first value, wherein said imbalance is indicated by said first number of goals exceeding said second number of goals and said second ranking exceeding said first ranking, wherein said means for optimally distributing includes means for updating said first number of goals by said deleting said goal or means for updating said second number of said goals by said adding said new goal associated with said second value, and wherein a result of said optimally distributing is said updated first number of goals does not exceed said second number of goals or said first number of goals does not exceed said updated second number of goals.

16. The system of claim 15, further comprising means for receiving a plurality of goal attributes associated with said set of goals, said plurality of goal attributes comprising attributes selected from the group consisting of classifications, priorities, time frames, and combinations thereof,
wherein a classification of said classifications classifies said goal according to said category and/or a type, said category and said type being defined by said goal-setter,
wherein a priority of said priorities indicates a relative urgency of achieving said goal, and
wherein a time frame of said time frames indicates a period of time during which said goal is to be achieved.

17. The system of claim 16, further comprising means for displaying said set of goals grouped by said goal attributes.

18. The system of claim 15, further comprising:
means for associating said goal with said action based on said identifier.

19. The system of claim 18, further comprising:
means for assigning a dream identifier to said dream;
means for associating said goal with said dream based on said dream identifier; and
means for associating, via an inheritance of said dream identifier by said action, said action with said dream.

20. The system of claim 15, wherein said means for receiving said goal includes means for receiving a template based on another goal defined prior to said goal, a template originally generated by said goal-setter, or a template generated by an expert in a subject associated with said goal.

21. The system of claim 15, further comprising:
means for exporting, to another system external to said computer system, information associated with said goal and/or said action.

22. The system of claim 15, further comprising:
means for importing, from another system external to said computer system, information to be associated with said goal and/or said action.

23. The system of claim 15, further comprising:
means for receiving a date, wherein said date is selected from the group consisting of a target date for achieving said goal, a due date for completing said action, and a combination thereof;
means for determining said date is impending or has passed; and
responsive to said determining said date is impending or has passed, means for automatically sending a message to said goal-setter, wherein said message is associated with said goal and/or said action.

24. The system of claim 15, further comprising:
means for receiving a date, wherein said date is selected from the group consisting of a target date for achieving said goal, a due date for completing said action, and a combination thereof;
means for receiving an association of a mentor to said goal, wherein said mentor provides said goal-setter with knowledge, advice, guidance and motivation for achieving said goal; and
means for automatically sending a message to said mentor, wherein said message is associated with said goal and/or said action, and wherein said automatically sending said message is performed in response to a condition selected from the group consisting of said attainment of said goal, a completion of said action, said target date or said due date being impending, said target date or said due date having passed, said target date or said due date being modified, and combinations thereof.

25. The system of claim 15, wherein said means for receiving said goal-setter attributes includes means for receiving said inspirations as multimedia electronic files, and wherein said system further comprises:
means for displaying a screen show employing said multimedia electronic files to motivate said goal-setter to attain said goal.

26. At least one program storage device readable by a machine, tangibly embodying at least one program of instructions executable by the machine to perform a method of managing a goal, said method comprising:
receiving a dream, a goal, and an action entered by a goal-setter via a single interface, wherein said goal-setter is an individual person, wherein said dream is a first achievement toward which effort is directed by said individual person, wherein said dream is classified in a category that represents an area of a life of said individual person, wherein said goal is a second achievement toward which effort is directed by said individual person, wherein said goal is subordinate to said dream in a hierarchy, wherein said goal is classified in said category that represents said area of said life of said individual person, wherein said action is a task to be performed by said individual person to achieve said goal;
assigning an identifier to said goal;
receiving goal-setter attributes entered by said individual person via said single interface, wherein said goal-setter attributes include values, strengths, weaknesses and inspirations of said individual person, wherein said values include principles espoused by said individual person and form bases of conduct of said individual person, wherein said strengths include first characteristics of said individual person that facilitate an attainment of said goal, wherein said weaknesses include second characteristics of said individual that hinder said attainment of said goal, wherein said inspirations include sources that motivate said individual person to attain said goal;
associating said goal-setter attributes with said goal based on said identifier assigned to said goal;
via said single interface, displaying views to said individual person, wherein said views indicate counts of goals in a set of goals grouped by said values, by said strengths and by said weaknesses, wherein said set of goals includes said goal and other goals entered by said individual person via said single interface, and wherein said views further indicate counts of said inspirations grouped by types of said inspirations;
subsequent to said displaying said views and in response to an entry on said single interface by said individual person, optimally distributing said goals in said set of goals among said values by deleting said goal or by adding a new goal to said set of goals to correct an imbalance based on a first number of goals exceeding a second number of goals, wherein said first number of goals counts a first subset of one or more goals including said goal in said set of goals associated with a first value of said values and said second number of goals counts a second subset of one or more goals in said set of goals associated with a second value of said values;
assigning a plurality of ranking levels to said values, wherein said ranking levels order said values to indicate a relative importance of each value to said individual person, wherein said optimally distributing said goals is based on said ranking levels, wherein said assigning said plurality of ranking levels includes assigning a first ranking level and a second ranking level of said plurality of ranking levels respectively to said first value and said second value, wherein said second ranking level exceeds said first ranking level to indicate that said second value is more important to said individual person than said first value, wherein said imbalance is indicated by said first number of goals exceeding said second number of goals and said second ranking exceeding said first ranking, wherein said optimally distributing includes updating said first number of goals by said deleting said goal or updating said second number of said goals by said adding said new goal associated with said second value, and wherein a result of said optimally distributing is said updated first number of goals does not exceed said second number of goals or said first number of goals does not exceed said updated second number of goals.

27. A process for deploying computing infrastructure, comprising integrating computer-readable code into a computing system comprising a processor, wherein the processor executes the code causing the computing system to perform a method of managing a goal, wherein said method comprises:
receiving a dream, a goal, and an action entered by a goal-setter via a single interface, wherein said goal-setter is an individual person, wherein said dream is a first achievement toward which effort is directed by said individual person, wherein said dream is classified in a category that represents an area of a life of said individual person, wherein said goal is a second achievement toward which effort is directed by said individual person, wherein said goal is subordinate to said dream in a hierarchy, wherein said goal is classified in said category that represents said area of said life of said individual person, wherein said action is a task to be performed by said individual person to achieve said goal;

assigning an identifier to said goal;

receiving goal-setter attributes entered by said individual person via said single interface, wherein said goal-setter attributes include values, strengths, weaknesses and inspirations of said individual person, wherein said values include principles espoused by said individual person and form bases of conduct of said individual person, wherein said strengths include first characteristics of said individual person that facilitate an attainment of said goal, wherein said weaknesses include second characteristics of said individual that hinder said attainment of said goal, wherein said inspirations include sources that motivate said individual person to attain said goal;

associating said goal-setter attributes with said goal based on said identifier assigned to said goal;

via said single interface, displaying views to said individual person, wherein said views indicate counts of goals in a set of goals grouped by said values, by said strengths and by said weaknesses, wherein said set of goals includes said goal and other goals entered by said individual person via said single interface, and wherein said views further indicate counts of said inspirations grouped by types of said inspirations;

subsequent to said displaying said views and in response to an entry on said single interface by said individual person, a processor of said computing system optimally distributing said goals in said set of goals among said values by deleting said goal or by adding a new goal to said set of goals to correct an imbalance based on a first number of goals exceeding a second number of goals, wherein said first number of goals counts a first subset of one or more goals including said goal in said set of goals associated with a first value of said values and said second number of goals counts a second subset of one or more goals in said set of goals associated with a second value of said values;

assigning a plurality of ranking levels to said values, wherein said ranking levels order said values to indicate a relative importance of each value to said individual person, wherein said optimally distributing said goals is based on said ranking levels, wherein said assigning said plurality of ranking levels includes assigning a first ranking level and a second ranking level of said plurality of ranking levels respectively to said first value and said second value, wherein said second ranking level exceeds said first ranking level to indicate that said second value is more important to said individual person than said first value, wherein said imbalance is indicated by said first number of goals exceeding said second number of goals and said second ranking exceeding said first ranking, wherein said optimally distributing includes updating said first number of goals by said deleting said goal or updating said second number of said goals by said adding said new goal associated with said second value, and wherein a result of said optimally distributing is said updated first number of goals does not exceed said second number of goals or said first number of goals does not exceed said updated second number of goals.

* * * * *